(12) United States Patent
Suzuki et al.

(10) Patent No.: US 10,542,154 B2
(45) Date of Patent: Jan. 21, 2020

(54) DEVICE FOR ASSISTING TWO-WAY CONVERSATION AND METHOD FOR ASSISTING TWO-WAY CONVERSATION

(71) Applicant: Panasonic Intellectual Property Management Co., Ltd., Osaka (JP)

(72) Inventors: Ryoji Suzuki, Nara (JP); Hiromasa Ohashi, Osaka (JP); Naoya Tanaka, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 101 days.

(21) Appl. No.: 15/737,465

(22) PCT Filed: Sep. 29, 2016

(86) PCT No.: PCT/JP2016/004390
§ 371 (c)(1),
(2) Date: Dec. 18, 2017

(87) PCT Pub. No.: WO2017/064839
PCT Pub. Date: Apr. 20, 2017

(65) Prior Publication Data
US 2018/0115650 A1  Apr. 26, 2018

(30) Foreign Application Priority Data
Oct. 16, 2015 (JP) .................. 2015-205018

(51) Int. Cl.
*H04M 9/08* (2006.01)
*G10L 21/0208* (2013.01)
(Continued)

(52) U.S. Cl.
CPC ......... *H04M 9/082* (2013.01); *G10L 21/0208* (2013.01); *H04M 3/002* (2013.01);
(Continued)

(58) Field of Classification Search
CPC . H04B 3/32; H04B 3/231; H04B 3/20; H04B 3/235; H04B 3/237; H04B 3/487;
(Continued)

(56) References Cited

U.S. PATENT DOCUMENTS 4,677,676 A 6/1987 Eriksson
5,033,082 A 7/1991 Eriksson et al.
(Continued)

FOREIGN PATENT DOCUMENTS

EP   0903726 A2 *  3/1999  ............ H04M 9/082
EP    903726 A2    3/1999
(Continued)

OTHER PUBLICATIONS

The Extended European Search Report dated Apr. 10, 2018 for European Patent Application No. 16855096.0.
(Continued)

*Primary Examiner* — Akelaw Teshale
(74) *Attorney, Agent, or Firm* — Greenblum & Bernstein, P.L.C.

(57) ABSTRACT

A two-way conversation assisting device includes a first microphone that enters a first voice, a first loudspeaker that outputs the first voice, a second microphone that enters a second voice, a second loudspeaker that outputs the second voice, and a first echo and crosstalk canceller. The first echo and crosstalk canceller estimates and calculates, using an input signal into the second loudspeaker, a first interference signal indicative of degrees of a first echo caused when the second voice output from the second loudspeaker enters into the first microphone and first crosstalk caused when the second voice enters into the first microphone, and removes the calculated first interference signal from an output signal of the first microphone.

22 Claims, 6 Drawing Sheets

(51) Int. Cl.
*H04R 3/02* (2006.01)
*H04R 27/00* (2006.01)
*H04M 3/00* (2006.01)
*H04M 3/40* (2006.01)

(52) U.S. Cl.
CPC ............. *H04M 3/40* (2013.01); *H04M 9/085* (2013.01); *H04R 3/02* (2013.01); *H04R 27/00* (2013.01); *G10L 2021/02082* (2013.01); *G10L 2021/02087* (2013.01); *H04R 2499/13* (2013.01)

(58) Field of Classification Search
CPC .... H04M 9/082; H04M 11/062; H04M 3/002; H04M 3/34; H04M 3/40; H04M 9/085; H04R 3/02; H04R 27/00; H04R 2499/13; G10L 21/0208; G10L 2021/02087; G10L 2021/02082
See application file for complete search history.

(56) References Cited

U.S. PATENT DOCUMENTS

| | | | |
|---|---|---|---|
| 6,934,387 B1* | 8/2005 | Kim | H04B 3/23 379/406.01 |
| 6,980,663 B1 | 12/2005 | Linhard | |
| 7,039,197 B1 | 5/2006 | Venkatesh et al. | |
| 8,077,859 B1* | 12/2011 | Xiaopeng | H04B 3/32 379/406.08 |
| 2004/0247022 A1* | 12/2004 | Raghavan | H04B 3/32 375/219 |
| 2005/0159945 A1 | 7/2005 | Otsuka et al. | |
| 2011/0064174 A1* | 3/2011 | Huang | H04B 3/23 375/350 |
| 2011/0145000 A1 | 6/2011 | Hoepken et al. | |
| 2014/0056423 A1 | 2/2014 | Nishikawa et al. | |
| 2018/0158467 A1 | 6/2018 | Suzuki et al. | |

FOREIGN PATENT DOCUMENTS

| | | |
|---|---|---|
| EP | 932142 A2 | 7/1999 |
| EP | 3333850 A1 | 6/2018 |
| JP | 61-194958 | 8/1986 |
| WO | 2017/064840 A1 | 4/2017 |

OTHER PUBLICATIONS

Communication pursuant to Article 94(3) EPC dated Jan. 21, 2019 for European Patent Application No. 16855096.0.
International Search Report of PCT application No. PCT/JP2016/004390 dated Dec. 6, 2016.

* cited by examiner

DEVICE FOR ASSISTING TWO-WAY CONVERSATION AND METHOD FOR ASSISTING TWO-WAY CONVERSATION

This application is a U.S. national stage application of the PCT international application No. PCT/JP2016/004390 filed on Sep. 29, 2016, which claims the benefit of foreign priority of Japanese patent application No. 2015-205018 filed on Oct. 16, 2015, the contents all of which are incorporated herein by reference.

TECHNICAL FIELD

The present disclosure relates to a two-way conversation assisting device and a two-way conversation assisting method both of which amplify and assist a two-way conversation between a first conversation participant and a second conversation participant.

BACKGROUND ART

PTL 1 discloses a loudspeaking telephone circuit capable of performing hands-free communications via a two-wire transmission line. This loudspeaking telephone circuit includes a first echo canceller for deleting a line echo signal in a two-wire/four-wire conversion circuit, a second echo canceller for deleting an interior echo signal caused through space propagation from a loudspeaker to a microphone, and a variable gain amplification circuit disposed between a transmission output side of the first echo canceller and a reception input side of the second echo canceller. Therefore, a hands-free communication quality can stably be obtained through an adjustment of a reception volume of a loudspeaker.

CITATION LIST

Patent Literature

PTL 1: Unexamined Japanese Patent Publication No. 1986-194958

SUMMARY OF THE INVENTION

The present disclosure provides a two-way conversation assisting device and a two-way conversation assisting method both of which amplify and assist a two-way conversation in which an acoustic noise including not only an echo (resound) but also crosstalk (overhearing) are removed.

The two-way conversation assisting device according to the present disclosure is a two-way conversation assisting device for amplifying and assisting a two-way conversation between a first conversation participant and a second conversation participant, the two-way conversation assisting device including a first microphone, a first loudspeaker, a second microphone, a second loudspeaker, and a first echo and crosstalk canceller. The first conversation participant enters a first voice into the first microphone. The first loudspeaker outputs the first voice. The second conversation participant enters a second voice into the second microphone. The second loudspeaker outputs the second voice. The first echo and crosstalk canceller estimates and calculates, using an input signal into the second loudspeaker, a first interference signal indicative of degrees of a first echo caused when the second voice output from the second loudspeaker enters into the first microphone and first crosstalk caused when the second voice enters into the first microphone, and removes the calculated first interference signal from an output signal of the first microphone.

A two-way conversation assisting method according to the present disclosure is a two-way conversation assisting method which is used in a conversation system, and amplifies and assists a two-way conversation between a first conversation participant and a second conversation participant. The conversation system includes a first microphone that enters a first voice of the first conversation participant, a first loudspeaker that outputs the first voice, a second microphone that enters a second voice of the second conversation participant, and a second loudspeaker that outputs the second voice. The two-way conversation assisting method includes a first echo and crosstalk cancellation step of estimating and calculating, using an input signal into the second loudspeaker, a first interference signal indicative of degrees of a first echo caused when the second voice output from the second loudspeaker enters into the first microphone and first crosstalk caused when the second voice enters into the first microphone, and removing the calculated first interference signal from an output signal of the first microphone.

The two-way conversation assisting device and the two-way conversation assisting method according to the present disclosure are effective for removing an acoustic noise including not only an echo (resound) but also crosstalk (overhearing), and for amplifying and assisting a two-way conversation.

DESCRIPTION OF EMBODIMENTS

Exemplary embodiments will now be described herein in detail with reference to the drawings appropriately. However, a detailed description more than necessary may be omitted. For example, a detailed description of an already known item and a duplicated description of a substantially identical configuration may be omitted. Such omissions are aimed to prevent the following description from being redundant more than necessary, and to help those skilled in the art easily understand the following description.

Note that the attached drawings and the following description are provided, by the inventors, for those skilled in the art to fully understand the present disclosure, and are not intended to limit the subject matter as described in the appended claims.

First Exemplary Embodiment

A first exemplary embodiment will now be described herein with reference to FIGS. 1 and 2.

[1-1. Exemplary Application]

Figure 1:
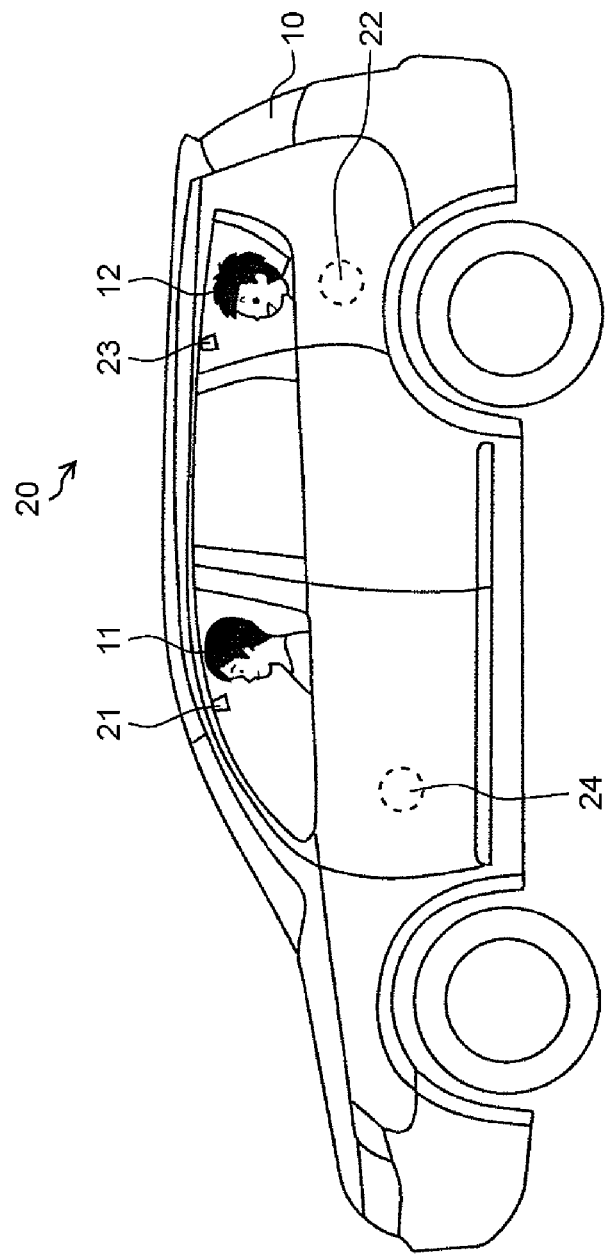
FIG. 1 is a view illustrating an exemplary application of a two-way conversation assisting device according to a first exemplary embodiment.

FIG. 1 is a view illustrating an exemplary application of two-way conversation assisting device 20 according to the first exemplary embodiment. Shown in here is an example where two-way conversation assisting device 20 is applied as a device for amplifying and assisting a two-way conversation in vehicle 10 (as a device for assisting conversation).

Two-way conversation assisting device 20 is a device for amplifying and assisting a two-way conversation between first conversation participant 11 (in here, a driver) and second conversation participant 12 (in here, a rear passenger). At a ceiling above a driver's seat, first microphone 21 for entering a voice (first voice) of first conversation participant 11 is provided, and, at each of inside faces on both sides of a rear seat, first loudspeaker 22 for outputting the voice is provided. In addition, at the ceiling above the rear seat, second microphone 23 for entering a voice (second voice) of second conversation participant 12 is provided, and, at each of inside faces of two front doors, second loudspeaker 24 for outputting the voice is provided.

With two-way conversation assisting device 20, first conversation participant 11 and second conversation participant 12 are able to enjoy two-way conversations, in which acoustic noises including acoustic feedback (howling, ringing sound), echoes (resound), and crosstalk (overhearing) are removed, even in a narrower space in this vehicle.

Acoustic feedback refers to a phenomenon where a voice output from a loudspeaker from which a voice of a conversation participant is output returns and enters into a microphone into which a voice of the conversation participant enters. In here, acoustic feedback refers to a phenomenon where a voice output from first loudspeaker 22 returns and enters into first microphone 21, and to a phenomenon where a voice output from second loudspeaker 24 returns and enters into second microphone 23.

In addition, an echo refers to a phenomenon where a voice output toward a conversation participant comes around and enters into a microphone into which a voice of the conversation participant enters. In here, an echo refers to a phenomenon where a voice output from second loudspeaker 24 comes around and enters into first microphone 21, and to a phenomenon where a voice output from first loudspeaker 22 comes around and enters into second microphone 23.

In addition, crosstalk refers to a phenomenon where a voice of a conversation participant enters into a microphone into which a voice of another conversation participant enters. In here, crosstalk refers to a phenomenon where a voice of second conversation participant 12 enters into first microphone 21, and to a phenomenon where a voice of first conversation participant 11 enters into second microphone 23.

[1-2. Configuration]

Figure 2:
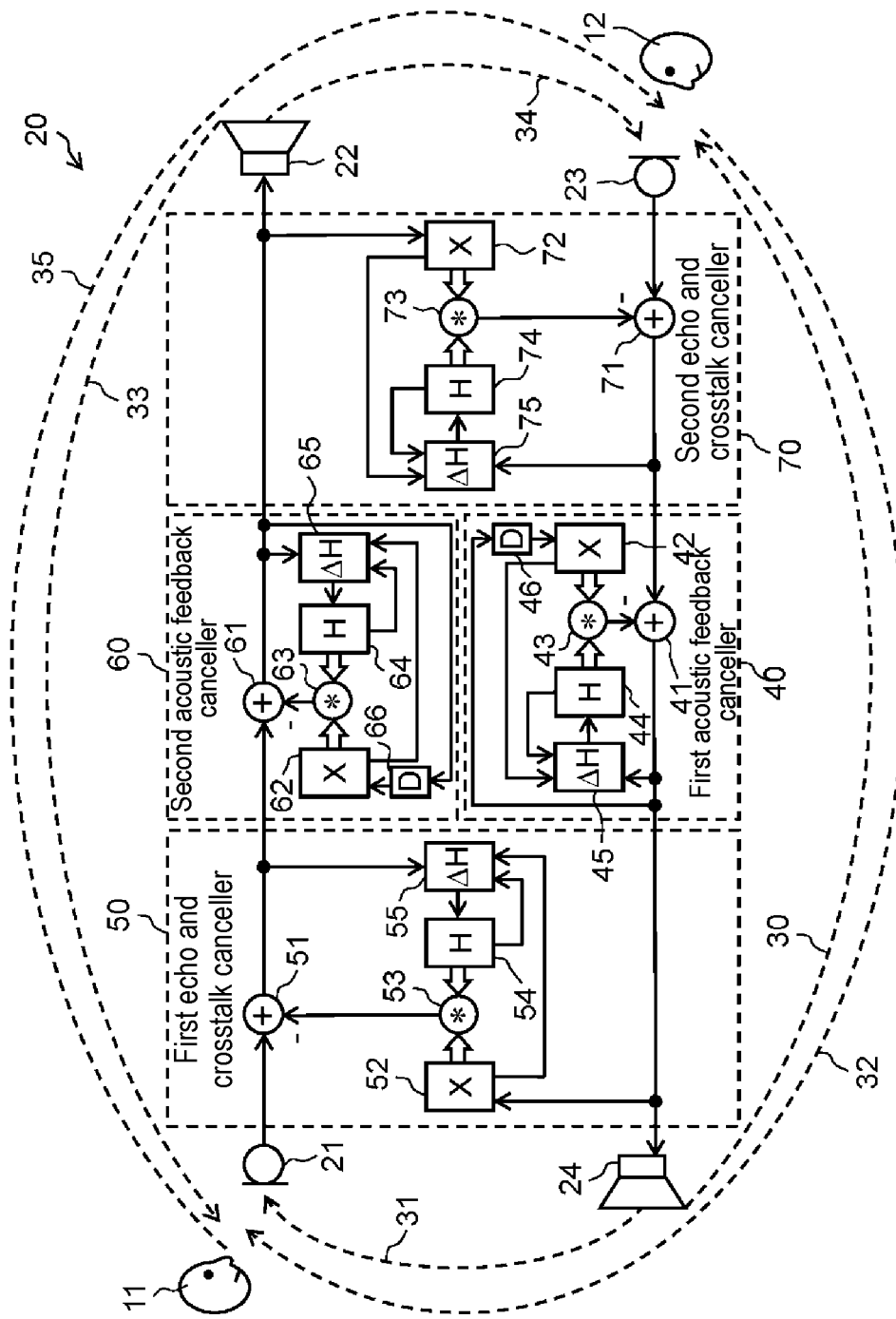
FIG. 2 is a block diagram illustrating a configuration of the two-way conversation assisting device shown in FIG. 1.

FIG. 2 is a block diagram illustrating a configuration of two-way conversation assisting device 20 shown in FIG. 1. Two-way conversation assisting device 20 includes first microphone 21, first loudspeaker 22, second microphone 23, second loudspeaker 24, first acoustic feedback canceller 40, first echo and crosstalk canceller 50, second acoustic feedback canceller 60, and second echo and crosstalk canceller 70. Components of two-way conversation assisting device 20 are connected to each other in a wired or wireless manner. In addition, first acoustic feedback canceller 40, first echo and crosstalk canceller 50, second acoustic feedback canceller 60, and second echo and crosstalk canceller 70 are mounted, for example, as parts of a head unit for vehicle 10.

First microphone 21 is a microphone for entering a voice of first conversation participant 11, and is provided, for example, at the ceiling above the driver's seat in vehicle 10, as shown in FIG. 1. A voice signal output from first microphone 21 is, for example, digital voice data generated by an A/D converter built into or provided immediately after first microphone 21.

First loudspeaker 22 is a loudspeaker for outputting a voice of first conversation participant 11, and is provided, for example, at each of the inside faces on both the sides of the rear seat of vehicle 10, as shown in FIG. 1. For example, after digital voice data is input and converted into an analog signal by a D/A converter built into or provided immediately before first loudspeaker 22, first loudspeaker 22 outputs the analog signal as a voice.

Second microphone 23 is a microphone for entering a voice of second conversation participant 12, and is provided, for example, at the ceiling above the rear seat, as shown in FIG. 1. A voice signal output from second microphone 23 is, for example, digital voice data generated by an A/D converter built into or provided immediately after second microphone 23.

Second loudspeaker 24 is a loudspeaker for outputting a voice of second conversation participant 12, and is provided, for example, at each of the inside faces of the two front doors of vehicle 10, as shown in FIG. 1. For example, after digital voice data is input and converted into an analog signal by a D/A converter built into or provided immediately before second loudspeaker 24, second loudspeaker 24 outputs the analog signal as a voice.

[1-2-1. First Acoustic Feedback Canceller 40]

First acoustic feedback canceller 40 is a circuit for estimating and calculating a first acoustic feedback signal indicative of a degree of first acoustic feedback 30 caused when a voice output from second loudspeaker 24 returns and enters into second microphone 23, and for removing the calculated first acoustic feedback signal from an output signal of second microphone 23. In this exemplary embodiment, first acoustic feedback canceller 40 is a circuit for further removing the first acoustic feedback signal from an output signal of second echo and crosstalk canceller 70, in which a second interference signal described later is removed from the output signal of second microphone 23, and for outputting a signal obtained after the removal to second loudspeaker 24, and is also a digital signal processing circuit for processing digital voice data in a time domain.

More specifically, first acoustic feedback canceller 40 includes first transfer function storage circuit 44, first delay device 46, first storage circuit 42, first convolution arithmetic operation unit 43, first subtractor 41, and first transfer function update circuit 45.

First transfer function storage circuit 44 stores a transfer function estimated as a transfer function with respect to first acoustic feedback 30.

First delay device 46 delays an output signal of first acoustic feedback canceller 40.

First storage circuit 42 stores a signal output from first delay device 46.

First convolution arithmetic operation unit 43 performs a convolution with the signal stored in first storage circuit 42 and the transfer function stored in first transfer function storage circuit 44 to generate a first acoustic feedback signal. For example, first convolution arithmetic operation unit 43 is an N-tap finite impulse response (FIR) filter for performing a convolution arithmetic operation represented by expression 1 shown below.

[Mathematical expression 1]

$$y1'_t = \sum_{i=0}^{N-1} \{H1(i)_t \times x1(t-i-\tau1)\} \quad (1)$$

Where, $y1'_t$ represents a first acoustic feedback signal at time t. N represents a number of taps in the FIR filter. $H1(i)_t$ represents an i-th transfer function at time t among N pieces of transfer functions stored in first transfer function storage circuit 44. $x1(t-i-\tau1)$ represents a $(t-i-\tau1)$th signal among signals stored in first storage circuit 42. $\tau1$ represents a delay time by first delay device 46.

First subtractor 41 removes from an output signal of second echo and crosstalk canceller 70 a calculated first acoustic feedback signal output from first convolution arithmetic operation unit 43, and outputs an obtained signal as an output signal of first acoustic feedback canceller 40. For example, first subtractor 41 performs a subtraction represented by expression 2 shown below.

[Mathematical expression 2]

$$e1_t = y1_t - y1'_t \quad (2)$$

Where, $e1_t$ represents an output signal of first subtractor 41 at time t. $y1_t$ represents an output signal of second echo and crosstalk canceller 70 at time t.

First transfer function update circuit 45 updates the transfer function stored in first transfer function storage circuit 44 based on the output signal of first subtractor 41 and the signal stored in first storage circuit 42. For example, first transfer function update circuit 45 uses an independent component analysis, as represented by expression 3 shown below, to update the transfer function stored in first transfer function storage circuit 44 based on the output signal of first subtractor 41 and the signal stored in first storage circuit 42 such that the output signal of first subtractor 41 and the signal stored in first storage circuit 42 are independent from each other.

[Mathematical expression 3]

$$H1(j)_{t+1} = H1(j)_t + \alpha1 \times \varnothing1(e1_t) \times x1(t-j-\tau1) \quad (3)$$

Where, $H1(j)_{t+1}$ represents a j-th transfer function at time $t+1$ (i.e., after updated) among N pieces of transfer functions stored in first transfer function storage circuit 44. $H1(j)_t$ represents the j-th transfer function at time t (i.e., before updating) among N pieces of transfer functions stored in first transfer function storage circuit 44. $\alpha1$ represents a step size parameter for controlling a learning speed in estimating a transfer function with respect to first acoustic feedback 30. $\phi1$ represents a nonlinear function (e.g., a sigmoid function), a hyperbolic tangent function (a tan h function), a rectified linear function, or a sign function).

As described above, first transfer function update circuit 45 performs nonlinear processing using a nonlinear function on the output signal of first subtractor 41, performs a multiplication on an obtained result with the signal stored in first storage circuit 42 and a first step size parameter for controlling the learning speed in estimating the transfer function with respect to first acoustic feedback 30, and calculates a first update coefficient. Then, the calculated first update coefficient is added to the transfer function stored in first transfer function storage circuit 44 for updating.

[1-2-2. First Echo and Crosstalk Canceller 50]

First echo and crosstalk canceller 50 is a circuit for estimating and calculating, using an output signal of first acoustic feedback canceller 40, a first interference signal indicative of degrees of first echo 31 caused when a voice output from second loudspeaker 24 comes around and enters into first microphone 21 and first crosstalk 32 caused when a voice of second conversation participant 12 enters into first microphone 21, and for removing the calculated first interference signal from an output signal of first microphone 21. In this exemplary embodiment, first echo and crosstalk canceller 50 is a circuit for outputting to second acoustic feedback canceller 60 a signal in which a calculated first interference signal is removed, and is a digital signal processing circuit for processing digital voice data in a time domain. In here, the output signal of first acoustic feedback canceller 40 is an input signal into second loudspeaker 24, as shown in FIG. 2.

More specifically, first echo and crosstalk canceller 50 includes second transfer function storage circuit 54, second storage circuit 52, second convolution arithmetic operation unit 53, second subtractor 51, and second transfer function update circuit 55.

Second transfer function storage circuit 54 stores a transfer function estimated as a transfer function with respect to first echo 31 and first crosstalk 32 combined to each other.

Second storage circuit 52 stores an output signal of first acoustic feedback canceller 40.

Second convolution arithmetic operation unit 53 performs a convolution with the signal stored in second storage circuit 52 and the transfer function stored in second transfer function storage circuit 54 to generate a first interference signal. For example, second convolution arithmetic operation unit 53 is an N-tap FIR filter for performing a convolution arithmetic operation represented by expression 4 shown below.

[Mathematical expression 4]

$$y2'_t = \sum_{i=0}^{N-1} \{H2(i)_t \times x2(t-i)\} \quad (4)$$

Where, $y2'_t$ represents a first interference signal at time t. N represents a number of taps in the FIR filter. $H2(i)_t$ represents an i-th transfer function at time t among N pieces of transfer functions stored in second transfer function storage circuit 54. $x2(t-i)$ represents a $(t-i)$th signal among signals stored in second storage circuit 52.

Second subtractor 51 removes from an output signal of first microphone 21 a calculated first interference signal output from second convolution arithmetic operation unit 53, and outputs an obtained signal as an output signal of first echo and crosstalk canceller 50. For example, second subtractor 51 performs a subtraction represented by expression 5 shown below.

[Mathematical expression 5]

$$e2_t = y2_t - y2'_t \quad (5)$$

Where, $e2_t$ represents an output signal of second subtractor 51 at time t. $y2_t$ represents an output signal of first microphone 21 at time t.

Second transfer function update circuit 55 updates the transfer function stored in second transfer function storage circuit 54 based on the output signal of second subtractor 51 and the signal stored in second storage circuit 52. For example, second transfer function update circuit 55 uses an independent component analysis, as represented by expression 6 shown below, to update the transfer function stored in second transfer function storage circuit 54 based on the output signal of second subtractor 51 and the signal stored in second storage circuit 52 such that the output signal of second subtractor 51 and the signal stored in second storage circuit 52 are independent from each other.

[Mathematical expression 6]

$$H2(j)_{t+1} = H2(j)_t + \alpha 2 \times \emptyset 2(e2_t) \times x2(t-j) \quad (6)$$

Where, $H2(j)_{t+1}$ represents a j-th transfer function at time t+1 (i.e., after updated) among N pieces of transfer functions stored in second transfer function storage circuit 54. $H2(j)_t$ represents the j-th transfer function at time t (i.e., before updating) among N pieces of transfer functions stored in second transfer function storage circuit 54. $\alpha 2$ represents a step size parameter for controlling a learning speed in estimating a transfer function with respect to first echo 31 and first crosstalk 32 combined to each other. $\phi 2$ represents a nonlinear function (e.g., a sigmoid function), a hyperbolic tangent function (a tan h function), a rectified linear function, or a sign function).

As described above, second transfer function update circuit 55 performs nonlinear processing using the nonlinear function on the output signal of second subtractor 51, performs a multiplication on an obtained result with the signal stored in second storage circuit 52 and the second step size parameter for controlling the learning speed in estimating the transfer function with respect to first echo 31 and first crosstalk 32 combined to each other, and calculates a second update coefficient. Then, the calculated second update coefficient is added to the transfer function stored in second transfer function storage circuit 54 for updating.

Two-way conversation assisting device 20 according to this exemplary embodiment is designed such that, for a voice of second conversation participant 12 uttered at a certain time, a time when an output signal of first acoustic feedback canceller 40 is input into first echo and crosstalk canceller 50 is identical to or earlier than a time when the voice of second conversation participant 12 enters into first microphone 21. In other words, a law of cause and effect is maintained such that first echo and crosstalk canceller 50 can cancel first crosstalk 32. This can appropriately be achieved by taking into account factors for determining a time when an output signal of first acoustic feedback canceller 40 is input into first echo and crosstalk canceller 50 (a speed of an A/D conversion, a processing speed in second echo and crosstalk canceller 70, a processing speed in first acoustic feedback canceller 40, and other speeds) and factors for determining a time when a voice of second conversation participant 12 enters into first microphone 21 (a positional relationship between second conversation participant 12 and first microphone 21, and other relationships).

[1-2-3. Second Acoustic Feedback Canceller 60]

Second acoustic feedback canceller 60 is provided between first echo and crosstalk canceller 50 and first loudspeaker 22. Second acoustic feedback canceller 60 is a circuit for estimating and calculating a second acoustic feedback signal indicative of a degree of second acoustic feedback 33 caused when a voice output from first loudspeaker 22 returns and enters into first microphone 21, and for removing the calculated second acoustic feedback signal from an output signal of first microphone 21. In this exemplary embodiment, second acoustic feedback canceller 60 is a circuit for further removing the second acoustic feedback signal from an output signal of first echo and crosstalk canceller 50, in which a calculated first interference signal is removed from the output signal of first microphone 21, and for outputting a signal obtained after the removal to first loudspeaker 22, and is also a digital signal processing circuit for processing digital voice data in a time domain.

More specifically, second acoustic feedback canceller 60 includes third transfer function storage circuit 64, second delay device 66, third storage circuit 62, third convolution arithmetic operation unit 63, third subtractor 61, and third transfer function update circuit 65.

Third transfer function storage circuit 64 stores a transfer function estimated as a transfer function with respect to second acoustic feedback 33.

Second delay device 66 delays an output signal of second acoustic feedback canceller 60.

Third storage circuit 62 stores a signal output from second delay device 66.

Third convolution arithmetic operation unit 63 performs a convolution with the signal stored in third storage circuit 62 and the transfer function stored in third transfer function storage circuit 64 to generate a second acoustic feedback signal. For example, third convolution arithmetic operation unit 63 is an N-tap FIR filter for performing a convolution arithmetic operation represented by expression 7 shown below.

[Mathematical expression 7]

$$y3'_t = \sum_{i=0}^{N-1} \{H3(i)_t \times x3(t-i-\tau 2)\} \quad (7)$$

Where, $y3'_t$ represents a second acoustic feedback signal at time t. N represents a number of taps in the FIR filter. $H3(i)_t$ represents an i-th transfer function at time t among N pieces of transfer functions stored in third transfer function storage circuit 64. $x3(t-i-\tau 2)$ represents a $(t-i-\tau 2)$th signal among signals stored in third storage circuit 62. $\tau 2$ represents a delay time by second delay device 66.

Third subtractor 61 removes from an output signal of first echo and crosstalk canceller 50 a calculated second acoustic feedback signal output from third convolution arithmetic operation unit 63, and outputs an obtained signal as an output signal of second acoustic feedback canceller 60. For example, third subtractor 61 performs a subtraction represented by expression 8 shown below.

[Mathematical expression 8]

$$e3_t = y3_t - y3'_t \quad (8)$$

Where, $e3_t$ represents an output signal of third subtractor 61 at time t. $y3_t$ represents an output signal of first echo and crosstalk canceller 50 at time t.

Third transfer function update circuit 65 updates the transfer function stored in third transfer function storage circuit 64 based on the output signal of third subtractor 61 and the signal stored in third storage circuit 62. For example, third transfer function update circuit 65 uses an independent component analysis, as represented by expression 9 shown below, to update the transfer function stored in third transfer function storage circuit 64 based on the output signal of third subtractor 61 and the signal stored in third storage circuit 62 such that the output signal of third subtractor 61 and the signal stored in third storage circuit 62 are independent from each other.

[Mathematical expression 9]

$$H3(j)_{t+1} = H3(j)_t + \alpha 3 \times \varnothing 3(e3_t) \times x3(t-j-\tau 2) \qquad (9)$$

Where, H3(j)$_{t+1}$ represents a j-th transfer function at time t+1 (i.e., after updated) among N pieces of transfer functions stored in third transfer function storage circuit 64. H3(j)$_t$ represents the j-th transfer function at time t (i.e., before updating) among N pieces of transfer functions stored in third transfer function storage circuit 64. α3 represents a step size parameter for controlling a learning speed in estimating a transfer function with respect to second acoustic feedback 33. ϕ3 represents a nonlinear function (e.g., a sigmoid function), a hyperbolic tangent function (a tan h function), a rectified linear function, or a sign function).

As described above, third transfer function update circuit 65 performs nonlinear processing using a nonlinear function on the output signal of third subtractor 61, performs a multiplication on an obtained result with the signal stored in third storage circuit 62 and the third step size parameter for controlling the learning speed in estimating the transfer function with respect to second acoustic feedback 33, and calculates a third update coefficient. Then, the calculated third update coefficient is added to the transfer function stored in third transfer function storage circuit 64 for updating.

[1-2-4. Second Echo and Crosstalk Canceller 70]

Second echo and crosstalk canceller 70 is a circuit for estimating and calculating, using an output signal of second acoustic feedback canceller 60, a second interference signal indicative of degrees of second echo 34 caused when a voice output from first loudspeaker 22 comes around and enters into second microphone 23 and second crosstalk 35 caused when a voice of first conversation participant 11 enters into second microphone 23, and for removing the calculated second interference signal from an output signal of second microphone 23. In this exemplary embodiment, second echo and crosstalk canceller 70 is a circuit for outputting to first acoustic feedback canceller 40 a signal in which a calculated second interference signal is removed, and is a digital signal processing circuit for processing digital voice data in a time domain. In here, the output signal of second acoustic feedback canceller 60 is an input signal into first loudspeaker 22, as shown in FIG. 2.

More specifically, second echo and crosstalk canceller 70 includes fourth transfer function storage circuit 74, fourth storage circuit 72, fourth convolution arithmetic operation unit 73, fourth subtractor 71, and fourth transfer function update circuit 75.

Fourth transfer function storage circuit 74 stores a transfer function estimated as a transfer function with respect to second echo 34 and second crosstalk 35 combined to each other.

Fourth storage circuit 72 stores an output signal of second acoustic feedback canceller 60.

Fourth convolution arithmetic operation unit 73 performs a convolution with the signal stored in fourth storage circuit 72 and the transfer function stored in fourth transfer function storage circuit 74 to generate a second interference signal. For example, fourth convolution arithmetic operation unit 73 is an N-tap FIR filter for performing a convolution arithmetic operation represented by expression 10 shown below.

[Mathematical expression 10]

$$y4'_t = \sum_{i=0}^{N-1} \{H4(i)_t \times x4(t-i)\} \qquad (10)$$

Where, y4'$_t$ represents a second interference signal at time t. N represents a number of taps in the FIR filter. H4(i)$_t$ represents an i-th transfer function at time t among N pieces of transfer functions stored in fourth transfer function storage circuit 74. x4(t−i) represents a (t−i)th signal among signals stored in fourth storage circuit 72.

Fourth subtractor 71 removes from an output signal of second microphone 23 a calculated second interference signal output from fourth convolution arithmetic operation unit 73, and outputs an obtained signal as an output signal of second echo and crosstalk canceller 70. For example, fourth subtractor 71 performs a subtraction represented by expression 11 shown below.

[Mathematical expression 11]

$$e4_t = y4_t - y4'_t \qquad (11)$$

Where, e4$_t$ represents an output signal of fourth subtractor 71 at time t. y4$_t$ represents an output signal of second microphone 23 at time t.

Fourth transfer function update circuit 75 updates the transfer function stored in fourth transfer function storage circuit 74 based on the output signal of fourth subtractor 71 and the signal stored in fourth storage circuit 72. For example, fourth transfer function update circuit 75 uses an independent component analysis, as represented by expression 12 shown below, to update the transfer function stored in fourth transfer function storage circuit 74 based on the output signal of fourth subtractor 71 and the signal stored in fourth storage circuit 72 such that the output signal of fourth subtractor 71 and the signal stored in fourth storage circuit 72 are independent from each other.

[Mathematical expression 12]

$$H4(j)_{t+1} = H4(j)_t + \alpha 4 \times \varnothing 4(e4_t) \times x4(t-j) \qquad (12)$$

Where, H4(j)$_{t+1}$ represents a j-th transfer function at time t+1 (i.e., after updated) among N pieces of transfer functions stored in fourth transfer function storage circuit 74. H4(j)$_t$ represents the j-th transfer function at time t (i.e., before updating) among N pieces of transfer functions stored in fourth transfer function storage circuit 74. α4 represents a step size parameter for controlling a learning speed in estimating a transfer function with respect to second echo 34 and second crosstalk 35 combined to each other. ϕ4 represents a nonlinear function (e.g., a sigmoid function), a hyperbolic tangent function (a tan h function), a rectified linear function, or a sign function).

As described above, fourth transfer function update circuit 75 performs nonlinear processing using a nonlinear function on the output signal of fourth subtractor 71, performs a multiplication on an obtained result with the signal stored in fourth storage circuit 72 and the fourth step size parameter for controlling the learning speed in estimating the transfer function with respect to second echo 34 and second crosstalk 35 combined to each other, and calculates a fourth update coefficient. Then, the calculated fourth update coefficient is added to the transfer function stored in fourth transfer function storage circuit 74 for updating.

Two-way conversation assisting device 20 according to this exemplary embodiment is designed such that, for a voice of first conversation participant 11 uttered at a certain time, a time when an output signal of second acoustic feedback canceller 60 is input into second echo and crosstalk canceller 70 is identical to or earlier than a time when a voice of first conversation participant 11 enters into second microphone 23. In other words, a law of cause and effect is maintained such that second echo and crosstalk canceller 70 can cancel second crosstalk 35. This can appropriately be achieved by taking into account factors for determining a time when an output signal of second acoustic feedback canceller 60 is input into second echo and crosstalk canceller 70 (a speed of an A/D conversion, a processing speed in first echo and crosstalk canceller 50, a processing speed in second acoustic feedback canceller 60, and other speeds) and factors for determining a time when a voice of first conversation participant 11 enters into second microphone 23 (a positional relationship between first conversation participant 11 and second microphone 23, and other relationships).

[1-3. Operation]

In two-way conversation assisting device 20 according to this exemplary embodiment configured as described above, a voice of first conversation participant 11 and a voice of second conversation participant 12 are processed as described below.

A voice of first conversation participant 11 enters into first microphone 21. First echo and crosstalk canceller 50 removes a calculated first interference signal from an output signal of first microphone 21. A first interference signal is an (estimated) signal indicative of degrees of first echo 31 and first crosstalk 32. Therefore, an output signal of first echo and crosstalk canceller 50 is a signal representing a voice in which effects of first echo 31 and first crosstalk 32 are removed from the voice entered into first microphone 21.

Then, second acoustic feedback canceller 60 removes a second acoustic feedback signal from the output signal of first echo and crosstalk canceller 50. A second acoustic feedback signal is an (estimated) signal indicative of a degree of second acoustic feedback 33. Therefore, an output signal of second acoustic feedback canceller 60 is a signal in which an effect of second acoustic feedback 33 is removed from the output signal of first echo and crosstalk canceller 50. This signal is input into first loudspeaker 22, and is output as a voice.

Therefore, the voice output from first loudspeaker 22 is the voice in which the effects of first echo 31, first crosstalk 32, and second acoustic feedback 33 are removed from the voice entered into first microphone 21, in other words, is only the voice of first conversation participant 11 in which an acoustic noise is removed.

Similarly, a voice of second conversation participant 12 enters into second microphone 23. Second echo and crosstalk canceller 70 removes a calculated second interference signal from an output signal of second microphone 23. A second interference signal is an (estimated) signal indicative of degrees of second echo 34 and second crosstalk 35. Therefore, an output signal of second echo and crosstalk canceller 70 is a signal representing a voice in which effects of second echo 34 and second crosstalk 35 are removed from the voice entered into second microphone 23.

Then, first acoustic feedback canceller 40 removes a first acoustic feedback signal from the output signal of second echo and crosstalk canceller 70. A first acoustic feedback signal is an (estimated) signal indicative of a degree of first acoustic feedback 30. Therefore, an output signal of first acoustic feedback canceller 40 is a signal in which an effect of first acoustic feedback 30 is removed from the output signal of second echo and crosstalk canceller 70. This signal is input into second loudspeaker 24, and is output as a voice.

Therefore, the voice output from second loudspeaker 24 is the voice in which the effects of second echo 34, second crosstalk 35, and first acoustic feedback 30 are removed from the voice entered into second microphone 23, in other words, is only the voice of second conversation participant 12 in which an acoustic noise is removed.

It is needless to say that how many of acoustic noises are removed depends on factors including accuracy of transfer functions retained in first acoustic feedback canceller 40, first echo and crosstalk canceller 50, second acoustic feedback canceller 60, and second echo and crosstalk canceller 70, and parameters used in the updating expressions for transfer functions, which are represented by expressions 3, 6, 9, and 12 described above.

[1-4. Effects and Other Benefits]

As described above, two-way conversation assisting device 20 according to this exemplary embodiment includes first microphone 21 and first echo and crosstalk canceller 50. Two-way conversation assisting device 20 is also designed such that, for a voice of second conversation participant 12 uttered at a certain time, a time when a signal is input into first echo and crosstalk canceller 50 is identical to or earlier than a time when a voice of second conversation participant 12 enters into first microphone 21. Therefore, first echo and crosstalk canceller 50 estimates and removes from an output signal of first microphone 21 not only first echo 31 caused when a voice output from second loudspeaker 24 comes around and enters into first microphone 21, but also first crosstalk 32 caused when a voice of second conversation participant 12 enters into first microphone 21.

Therefore, an acoustic noise, due to first echo 31 and first crosstalk 32, can be removed from an output signal of first microphone 21, without using, for example, a sound source separation technology for separating a voice of first conversation participant 11 and a voice of second conversation participant 12, both entering into first microphone 21 (first crosstalk 32), to extract only the voice of first conversation participant 11. Accordingly, without using additional hardware, amplification of a voice, due to first crosstalk 32, from first loudspeaker 22 adjacent to second conversation participant 12 can be suppressed.

Similarly, two-way conversation assisting device 20 according to this exemplary embodiment includes second microphone 23 and second echo and crosstalk canceller 70. Two-way conversation assisting device 20 is also designed such that, for a voice of first conversation participant 11 uttered at a certain time, a time when a signal is input into second echo and crosstalk canceller 70 is identical to or earlier than a time when a voice of first conversation participant 11 enters into second microphone 23. Therefore, second echo and crosstalk canceller 70 estimates and removes from an output signal of second microphone 23 not only second echo 34 caused when a voice output from first loudspeaker 22 comes around and enters into second microphone 23, but also second crosstalk 35 caused when a voice of first conversation participant 11 enters into second microphone 23.

Therefore, an acoustic noise, due to second echo 34 and second crosstalk 35, can be removed from an output signal of second microphone 23, without using, for example, a sound source separation technology for separating a voice of second conversation participant 12 and a voice of first conversation participant 11, both entering into second microphone 23 (second crosstalk 35), to extract only the voice of second conversation participant 12. Accordingly, without using additional hardware, amplification of a voice, due to second crosstalk 35, from second loudspeaker 24 provided adjacent to first conversation participant 11 can be suppressed.

In addition, two-way conversation assisting device 20 according to this exemplary embodiment includes first microphone 21, first loudspeaker 22, second microphone 23, second loudspeaker 24, first acoustic feedback canceller 40, first echo and crosstalk canceller 50, second acoustic feedback canceller 60, and second echo and crosstalk canceller 70.

Generally, a distance between first microphone 21 and second loudspeaker 24, each provided adjacent to first conversation participant 11, is shorter than a distance between first microphone 21 and first loudspeaker 22, both of which are used for processing a voice of first conversation participant 11. Similarly, a distance between second microphone 23 and first loudspeaker 22, each provided adjacent to second conversation participant 12, is shorter than a distance between second microphone 23 and second loudspeaker 24, both of which are used for processing a voice of second conversation participant 12.

Therefore, in two-way conversation assisting device 20 according to this exemplary embodiment, first echo and crosstalk canceller 50 first removes first echo 31 and first crosstalk 32 from a voice entered into first microphone 21. Second acoustic feedback canceller 60 then removes second acoustic feedback 33. Similarly, second echo and crosstalk canceller 70 first removes second echo 34 and second crosstalk 35 from a voice entered into second microphone 23, and first acoustic feedback canceller 40 then removes first acoustic feedback 30.

As described above, first echo and crosstalk canceller 50 and second echo and crosstalk canceller 70 first respectively remove first echo 31 caused in a direction from second loudspeaker 24 to first microphone 21 and second echo 34 caused in a direction from first loudspeaker 22 to second microphone 23, a distance of each of which is shorter and acoustic coupling of each of which is thus stronger. Therefore, first echo 31 and second echo 34 respectively input into first microphone 21 and second microphone 23, both of which are strongest, are first removed. Therefore, second acoustic feedback canceller 60 lying downstream of first echo and crosstalk canceller 50 can easily remove second acoustic feedback 33, as well as first acoustic feedback canceller 40 lying downstream of second echo and crosstalk canceller 70 can easily remove first acoustic feedback 30. Accordingly, an acoustic noise can effectively be removed.

In addition to the removal of echoes as described above, first echo and crosstalk canceller 50 removes first crosstalk 32, as well as second acoustic feedback canceller 60 removes second acoustic feedback 33, from a voice entered into first microphone 21. Similarly, second echo and crosstalk canceller 70 removes second crosstalk 35, as well as first acoustic feedback canceller 40 removes first acoustic feedback 30, from a voice entered into second microphone 23, and thus all unnecessary signals entering into first microphone 21 and second microphone 23 are removed. Accordingly, without causing acoustic feedback, an echo, and crosstalk, voices in which an acoustic noise is removed can be amplified in a two-way manner in a single space such as a vehicle cabin.

In addition, in two-way conversation assisting device 20 according to this exemplary embodiment, a convolution arithmetic operation unit is provided in each of first acoustic feedback canceller 40, first echo and crosstalk canceller 50, second acoustic feedback canceller 60, and second echo and crosstalk canceller 70. Accordingly, signal processing for removing an acoustic noise is performed in a time domain, instead of a frequency domain, without requiring other processing such as fast Fourier transform (FFT), and as a result, an acoustic noise can securely be removed through fast signal processing.

[1-5. Modifications]

In the above-described exemplary embodiment, first transfer function update circuit 45 has updated a transfer function in accordance with expression 3 described above. However, a transfer function may be updated in accordance with a normalized expression, as represented by expression 13 or 14 shown below.

[Mathematical expression 13]

$$H1(j)_{t+1} = H1(j)_t + \alpha 1 \times N \times \phi 1(e1_t) \times x1(t-j-\tau 1) \bigg/ \sum_{i=0}^{N-1} |x1(t-i-\tau 1)| \quad (13)$$

Where, N represents a number of transfer functions stored in first transfer function storage circuit 44. $|x1(t-i-\tau 1)|$ represents an absolute value of $x1(t-i-\tau 1)$.

[Mathematical expression 14]

$$H1(j)_{t+1} = H1(j)_t + \alpha 1 \times N \times \phi 1(e1_t) \times x1(t-j-\tau 1) \bigg/ \sum_{i=0}^{N-1} x1(t-i-\tau 1)^2 \quad (14)$$

Therefore, first transfer function update circuit 45 can stably update an estimated transfer function without depending on amplitude of input signal $x1(t-j)$.

Similarly, second transfer function update circuit 55 has updated a transfer function in accordance with expression 6 described above. However, a transfer function may be updated in accordance with a normalized expression, as represented by expression 15 or 16 shown below.

[Mathematical expression 15]

$$H2(j)_{t+1} = H2(j)_t + \alpha 2 \times N \times \phi 2(e2_t) \times x2(t-j) \bigg/ \sum_{i=0}^{N-1} |x2(t-i)| \quad (15)$$

Where, N represents a number of transfer functions stored in second transfer function storage circuit 54. $|x2(t-i)|$ represents an absolute value of $x2(t-i)$.

[Mathematical expression 16]

$$H2(j)_{t+1} = H2(j)_t + \alpha 2 \times N \times \phi 2(e2_t) \times x2(t-j) \bigg/ \sum_{i=0}^{N-1} x2(t-i)^2 \quad (16)$$

Therefore, second transfer function update circuit 55 can stably update an estimated transfer function without depending on amplitude of input signal $x2(t-j)$.

Similarly, third transfer function update circuit 65 has updated a transfer function in accordance with expression 9 described above. However, a transfer function may be updated in accordance with a normalized expression, as represented by expression 17 or 18 shown below.

[Mathematical expression 17]

$$H3(j)_{t+1} = H3(j)_t + \alpha 3 \times N \times \phi 3(e3_t) \times x3(t-j-\tau 3) \Big/ \sum_{i=0}^{N-1} |x3(t-i-\tau 3)| \quad (17)$$

Where, N represents a number of transfer functions stored in third transfer function storage circuit 64. $|x3(t-i-\tau 3)|$ represents an absolute value of $x3(t-i-\tau 3)$.

[Mathematical expression 18]

$$H3(j)_{t+1} = H3(j)_t + \alpha 3 \times N \times \phi 3(e3_t) \times x3(t-j-\tau 3) \Big/ \sum_{i=0}^{N-1} x3(t-i-\tau 3)^2 \quad (18)$$

Therefore, third transfer function update circuit 65 can stably update an estimated transfer function without depending on amplitude of input signal $x3(t-j)$.

Similarly, fourth transfer function update circuit 75 has updated a transfer function in accordance with expression 12 described above. However, a transfer function may be updated in accordance with a normalized expression, as represented by expression 19 or 20 shown below.

[Mathematical expression 19]

$$H4(j)_{t+1} = H4(j)_t + \alpha 4 \times N \times \phi 4(e4_t) \times x4(t-j) \Big/ \sum_{i=0}^{N-1} |x4(t-i)| \quad (19)$$

Where, N represents a number of transfer functions stored in fourth transfer function storage circuit 74. $|x4(t-i-\tau)|$ represents an absolute value of $x4(t-i-\tau)$.

[Mathematical expression 20]

$$H4(j)_{t+1} = H4(j)_t + \alpha 4 \times N \times \phi 4(e4_t) \times x4(t-j) \Big/ \sum_{i=0}^{N-1} x4(t-i)^2 \quad (20)$$

Therefore, fourth transfer function update circuit 75 can stably update an estimated transfer function without depending on amplitude of input signal $x4(t-j)$.

In addition, the above described exemplary embodiment is a two-way conversation assisting device. However, a two-way conversation assisting method as described below may be applied.

In other words, a two-way conversation assisting method which is used in a conversation system and amplifies and assists a two-way conversation between first conversation participant 11 and second conversation participant 12 may be applied. The conversation system includes first microphone 21 for entering a voice of first conversation participant 11, first loudspeaker 22 for outputting the voice of first conversation participant 11, second microphone 23 for entering a voice of second conversation participant 12, and second loudspeaker 24 for outputting the voice of second conversation participant 12. The two-way conversation assisting method includes a first acoustic feedback cancellation step, a first echo and crosstalk cancellation step, a second acoustic feedback cancellation step, and a second echo and crosstalk cancellation step.

In the first acoustic feedback cancellation step, a first acoustic feedback signal indicative of a degree of first acoustic feedback 30 caused when a voice output from second loudspeaker 24 returns and enters into second microphone 23 is estimated and calculated, the calculated first acoustic feedback signal is removed from a signal from second microphone 23, and a signal obtained after the removal is output to second loudspeaker 24. In here, the signal from second microphone 23 is the signal obtained in the second echo and crosstalk cancellation step.

In the first echo and crosstalk cancellation step, the signal input into second loudspeaker 24 is used to estimate and calculate a first interference signal indicative of degrees of first echo 31 caused when a voice output from second loudspeaker 24 comes around and enters into first microphone 21 and first crosstalk 32 caused when a voice of second conversation participant 12 enters into first microphone 21. In addition, the calculated first interference signal is removed from an output signal of first microphone 21. In here, the signal input into second loudspeaker 24 is the signal obtained in the first acoustic feedback cancellation step.

In the second acoustic feedback cancellation step, a second acoustic feedback signal indicative of a degree of second acoustic feedback 33 caused when a voice output from first loudspeaker 22 returns and enters into first microphone 21 is estimated and calculated, the calculated second acoustic feedback signal is removed from a signal from first microphone 21, and a signal obtained after the removal is output to first loudspeaker 22. In here, the signal from first microphone 21 is the signal obtained in the first echo and crosstalk cancellation step.

In the second echo and crosstalk cancellation step, the signal input into first loudspeaker 22 is used to estimate and calculate a second interference signal indicative of degrees of second echo 34 caused when a voice output from first loudspeaker 22 comes around and enters into second microphone 23 and second crosstalk 35 caused when a voice of first conversation participant 11 enters into second microphone 23. In addition, the calculated second interference signal is removed from an output signal of second microphone 23. In here, the signal input into first loudspeaker 22 is the signal obtained in the second acoustic feedback cancellation step.

The two-way conversation assisting method, as described above, is performed by, for example, a processor for executing a program. In other words, first acoustic feedback canceller 40, first echo and crosstalk canceller 50, second acoustic feedback canceller 60, and second echo and crosstalk canceller 70, in the above described exemplary embodiment, may each be achieved by a processor for executing a program. Such a processor includes a digital signal processor (DSP), a central processing unit (CPU), a micro-processing unit (MPU), and a microprocessor.

In addition, the two-way conversation assisting method, as described above, may be achieved by a program recorded in a computer readable recording medium such as a CD-ROM, and a recording medium in which the program is recorded.

Second Exemplary Embodiment

Next, a two-way conversation assisting device according to a second exemplary embodiment will now be described herein. Similar to the two-way conversation assisting device according to the first exemplary embodiment, the two-way conversation assisting device according to this exemplary embodiment is a device for amplifying and assisting a two-way conversation between a first conversation participant and a second conversation participant. However, the device is advantageous when second acoustic feedback 33, second echo, 34 and second crosstalk 35 observed in the first exemplary embodiment are negligibly smaller.

[2-1. Configuration]

Figure 3:
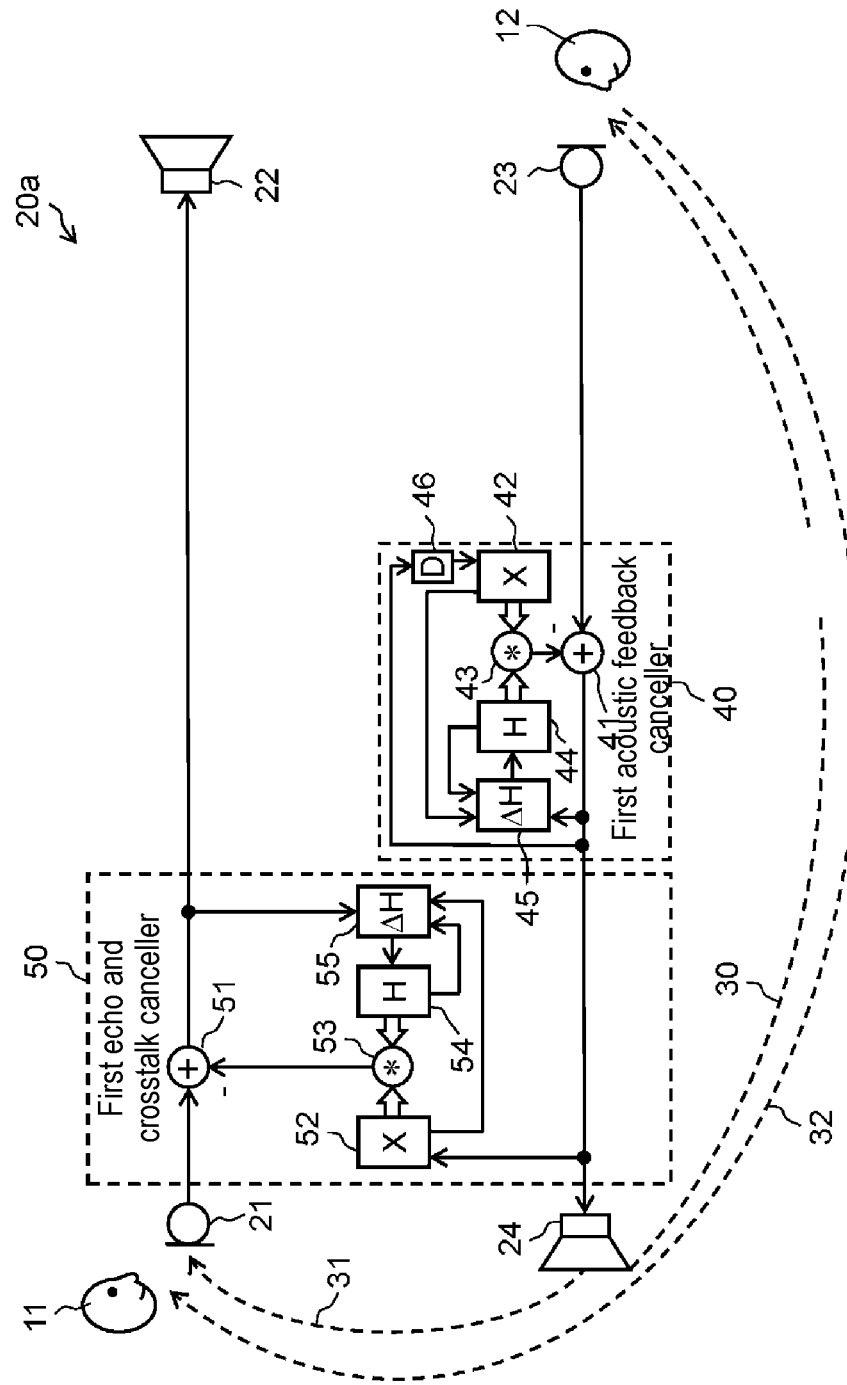
FIG. 3 is a block diagram illustrating a configuration of a two-way conversation assisting device according to a second exemplary embodiment.

FIG. 3 is a block diagram illustrating a configuration of two-way conversation assisting device 20a according to the second exemplary embodiment. Two-way conversation assisting device 20a corresponds to a configuration where second acoustic feedback canceller 60 and second echo and crosstalk canceller 70 are excluded from the configuration of two-way conversation assisting device 20 according to the first exemplary embodiment. Hereinafter, components identical to components of the first exemplary embodiment are applied with numerals or symbols identical to numerals or symbols used in the first exemplary embodiment, and descriptions of the components are omitted.

Two-way conversation assisting device 20a includes first microphone 21, first loudspeaker 22, second microphone 23, second loudspeaker 24, first acoustic feedback canceller 40, and first echo and crosstalk canceller 50. Above described components are identical to corresponding components of the first exemplary embodiment.

However, two-way conversation assisting device 20a does not include second acoustic feedback canceller 60 and second echo and crosstalk canceller 70 included in the first exemplary embodiment. Therefore, an output signal of first echo and crosstalk canceller 50 will be input into first loudspeaker 22, and an output signal of second microphone 23 will be input into first acoustic feedback canceller 40.

In addition, first loudspeaker 22 and second microphone 23 used by second conversation participant 12 typically configure a head set to be fitted to a head of second conversation participant 12.

[2-2. Operation]

Compared with two-way conversation assisting device 20 according to the first exemplary embodiment, two-way conversation assisting device 20a according to this exemplary embodiment which includes the configuration as described above, includes first acoustic feedback canceller 40 and first echo and crosstalk canceller 50. However, second acoustic feedback canceller 60 and second echo and crosstalk canceller 70 are not included. Therefore, two-way conversation assisting device 20a has functions for removing first acoustic feedback 30, first echo 31, and first crosstalk 32, but does not have functions for removing second acoustic feedback 33, second echo 34, and second crosstalk 35, among functions for removing acoustic noises, which are possessed by two-way conversation assisting device 20 according to the first exemplary embodiment.

In this exemplary embodiment, since first loudspeaker 22 and second microphone 23 used by second conversation participant 12 configure a head set, first loudspeaker 22 is closely fitted to an ear of second conversation participant 12, and as a result, a sound leak would be less likely to occur from first loudspeaker 22. Therefore, second acoustic feedback 33 and second echo 34 observed in the first exemplary embodiment can be neglected. In addition, since second microphone 23 is held adjacent to a mouth of second conversation participant 12, an effect of second crosstalk 35 caused when a voice of first conversation participant 11 enters into second microphone 23 can be neglected.

[2-3. Effects and Other Benefits]

Two-way conversation assisting device 20a according to this exemplary embodiment has least functions for removing acoustic noises (first acoustic feedback 30, first echo 31, and first crosstalk 32) need to be removed when first loudspeaker 22 and second microphone 23 used by second conversation participant 12 configure a head set. Therefore, compared with the first exemplary embodiment, least acoustic noises can be removed with a smaller configuration having a less number of components, in other words, with a cost effective, compact configuration.

Similar to the first exemplary embodiment, this exemplary embodiment may be achieved as a two-way conversation assisting method and a program. Such a two-way conversation assisting method includes the first acoustic feedback cancellation step and the first echo and crosstalk cancellation step as described above.

Third Exemplary Embodiment

Next, a two-way conversation assisting device according to a third exemplary embodiment will now be described herein. Similar to the two-way conversation assisting device according to the first exemplary embodiment, the two-way conversation assisting device according to this exemplary embodiment is a device for amplifying and assisting a two-way conversation between a first conversation participant and a second conversation participant. However, the device is advantageous when first acoustic feedback 30, second acoustic feedback 33, second echo 34, and second crosstalk 35 observed in the first exemplary embodiment are negligibly smaller.

[3-1. Configuration]

Figure 4:
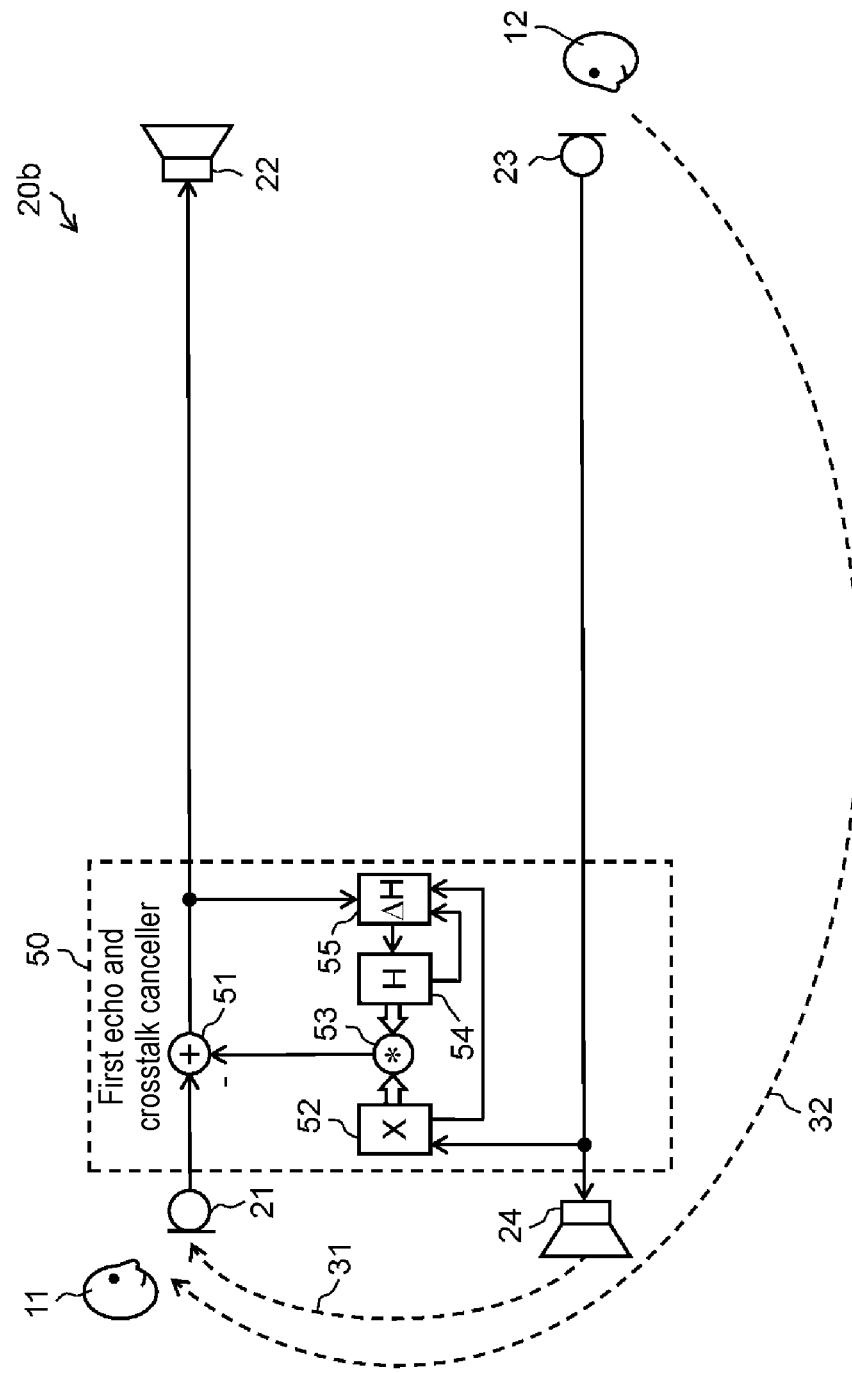
FIG. 4 is a block diagram illustrating a configuration of a two-way conversation assisting device according to a third exemplary embodiment.

FIG. 4 is a block diagram illustrating a configuration of two-way conversation assisting device 20b according to the third exemplary embodiment. Two-way conversation assisting device 20b has the configuration where first acoustic feedback canceller 40, second acoustic feedback canceller 60, and second echo and crosstalk canceller 70 are excluded from the configuration of two-way conversation assisting device 20 according to the first exemplary embodiment. In other words, two-way conversation assisting device 20b corresponds to a configuration where first acoustic feedback canceller 40 is excluded from the configuration of two-way conversation assisting device 20a according to the second exemplary embodiment. Hereinafter, components identical to components of the first exemplary embodiment are applied with numerals or symbols identical to numerals or symbols used in the first exemplary embodiment, and descriptions of the components are omitted.

Two-way conversation assisting device 20b includes first microphone 21, first loudspeaker 22, second microphone 23, second loudspeaker 24, and first echo and crosstalk canceller 50. Above described components are identical to corresponding components of the first exemplary embodiment.

However, since two-way conversation assisting device 20b does not include first acoustic feedback canceller 40, second acoustic feedback canceller 60, and second echo and crosstalk canceller 70 included in the first exemplary embodiment, an output signal of first echo and crosstalk canceller 50 will be input into first loudspeaker 22, and an output signal of second microphone 23 will be input into second loudspeaker 24 and first echo and crosstalk canceller 50.

In addition, first loudspeaker 22 and second microphone 23 used by second conversation participant 12 typically configure a head set to be fitted to a head of second conversation participant 12. In addition, second microphone 23 and second loudspeaker 24 are provided in an environment where first acoustic feedback 30 caused when a voice output from second loudspeaker 24 returns and enters into second microphone 23 is negligibly smaller. For example, second loudspeaker 24 is provided at a position from which a voice is output toward a direction opposite to a direction toward which second microphone 23 lies (or, has such a voice output directional characteristic).

[3-2. Operation]

Compared with two-way conversation assisting device 20 according to the first exemplary embodiment, two-way conversation assisting device 20b according to this exemplary embodiment which includes the configuration as described above includes first echo and crosstalk canceller 50. However, first acoustic feedback canceller 40, second acoustic feedback canceller 60, and second echo and crosstalk canceller 70 are not included. Therefore, two-way conversation assisting device 20b has functions for removing first echo 31 and first crosstalk 32, but does not have functions for removing first acoustic feedback 30, second acoustic feedback 33, second echo 34, and second crosstalk 35, among the functions for removing acoustic noises, which are possessed by two-way conversation assisting device 20, according to the first exemplary embodiment.

In this exemplary embodiment, since first loudspeaker 22 and second microphone 23 used by second conversation participant 12 configure a head set, first loudspeaker 22 is closely fitted to an ear of second conversation participant 12, and as a result, a sound leak would be less likely to occur from first loudspeaker 22. Therefore, second acoustic feedback 33 and second echo 34 observed in the first exemplary embodiment can be neglected. In addition, since second microphone 23 is held adjacent to the mouth of second conversation participant 12, an effect of second crosstalk 35 caused when a voice of first conversation participant 11 enters into second microphone 23 can be neglected. In addition, second microphone 23 and second loudspeaker 24 are provided in an environment where first acoustic feedback 30 caused when a voice output from second loudspeaker 24 returns and enters into second microphone 23 is negligibly smaller.

[3-3. Effects and Other Benefits]

In two-way conversation assisting device 20b according to this exemplary embodiment, first loudspeaker 22 and second microphone 23 used by second conversation participant 12 configure a head set. The device also has least functions for removing acoustic noises (first echo 31 and first crosstalk 32) need to be removed when the device is installed in an environment where acoustic coupling between second microphone 23 and second loudspeaker 24 is so smaller to an extent that first acoustic feedback 30 can be neglected. Accordingly, compared with the first and second exemplary embodiments, least acoustic noises can be removed with a smaller configuration having a less number of components, in other words, with a cost effective, compact configuration.

Similar to the first exemplary embodiment, this exemplary embodiment may be achieved as a two-way conversation assisting method and a program. Such a two-way conversation assisting method includes the above-described first echo and crosstalk cancellation step.

Fourth Exemplary Embodiment

Next, a two-way conversation assisting device according to a fourth exemplary embodiment will now be described herein. Similar to the two-way conversation assisting device according to the first exemplary embodiment, the two-way conversation assisting device according to this exemplary embodiment is a device for amplifying and assisting a two-way conversation between a first conversation participant and a second conversation participant. However, the device is advantageous when first acoustic feedback 30 and second acoustic feedback 33 observed in the first exemplary embodiment are negligibly smaller.

[4-1. Configuration]

Figure 5:
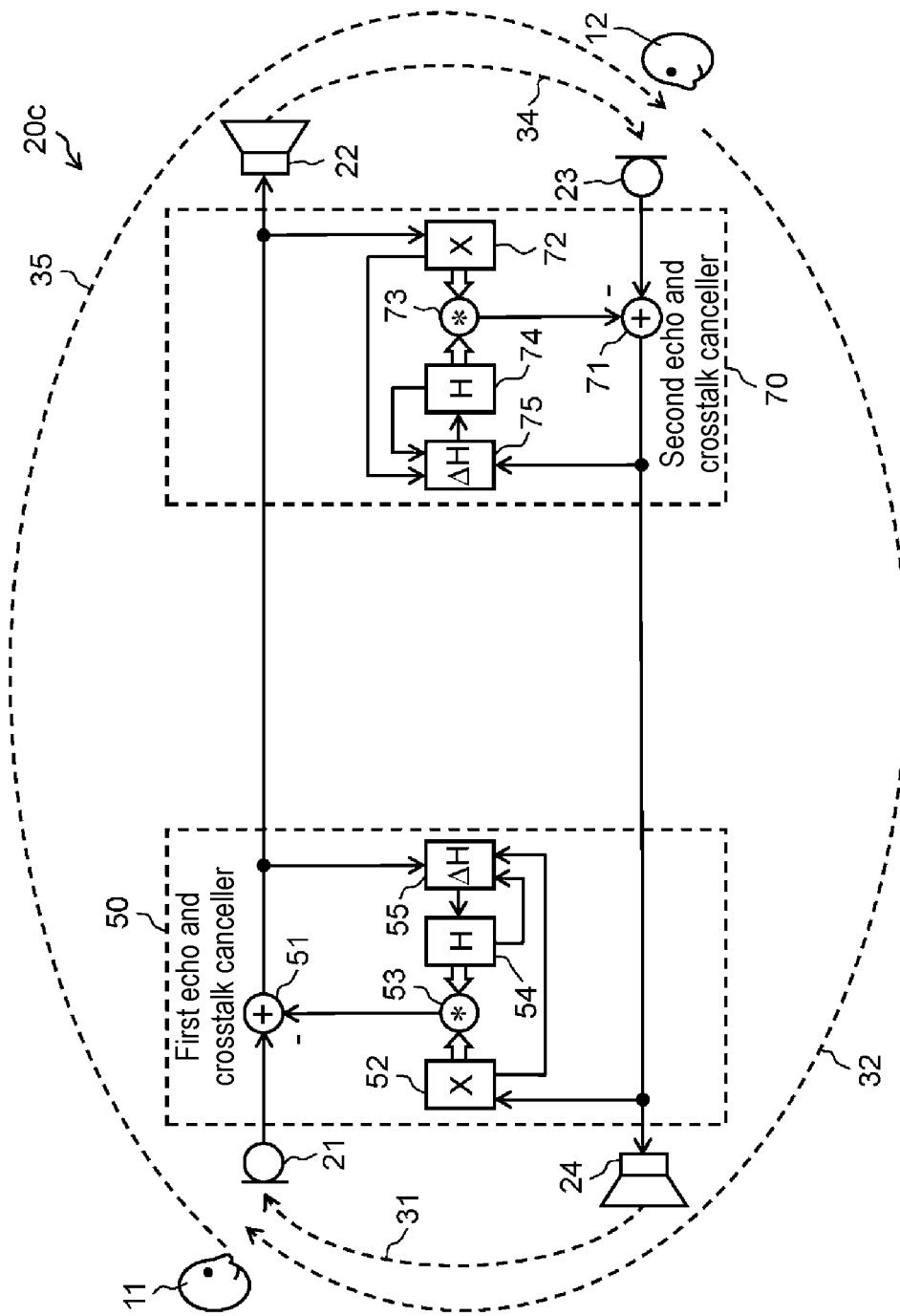
FIG. 5 is a block diagram illustrating a configuration of a two-way conversation assisting device according to a fourth exemplary embodiment.

FIG. 5 is a block diagram illustrating a configuration of two-way conversation assisting device 20c according to the fourth exemplary embodiment. Two-way conversation assisting device 20c corresponds to a configuration where first acoustic feedback canceller 40 and second acoustic feedback canceller 60 are excluded from the configuration of two-way conversation assisting device 20 according to the first exemplary embodiment. Hereinafter, components identical to components of the first exemplary embodiment are applied with numerals or symbols identical to numerals or symbols used in the first exemplary embodiment, and descriptions of the components are omitted.

Two-way conversation assisting device 20c includes first microphone 21, first loudspeaker 22, second microphone 23, second loudspeaker 24, first echo and crosstalk canceller 50, and second echo and crosstalk canceller 70. Above described components are identical to corresponding components of the first exemplary embodiment.

However, two-way conversation assisting device 20c does not include first acoustic feedback canceller 40 and second acoustic feedbackcanceller 60 included in the first exemplary embodiment. Therefore, an output signal of first echo and crosstalk canceller 50 will be input into first loudspeaker 22 and second echo and crosstalk canceller 70, and an output signal of second echo and crosstalk canceller 70 will be input into second loudspeaker 24 and first echo and crosstalk canceller 50.

In addition, first microphone 21 and first loudspeaker 22 are provided in an environment where second acoustic feedback 33 caused when a voice output from first loudspeaker 22 returns and enters into first microphone 21 is negligibly smaller. For example, first loudspeaker 22 is provided at a position from which a voice is output toward a direction opposite to a direction toward which first microphone 21 lies (or, has such a voice output directional characteristic).

Similarly, second microphone 23 and second loudspeaker 24 are provided in an environment where first acoustic feedback 30 caused when a voice output from second loudspeaker 24 returns and enters into second microphone 23 is negligibly smaller. For example, second loudspeaker 24 is provided at a position from which a voice is output toward a direction opposite to a direction toward which second microphone 23 lies (or, has such a voice output directional characteristic).

[4-2. Operation]

Compared with two-way conversation assisting device 20 according to the first exemplary embodiment, two-way conversation assisting device 20c according to this exemplary embodiment which includes the configuration as described above includes first echo and crosstalk canceller 50 and second echo and crosstalk canceller 70. However, first acoustic feedback canceller 40 and second acoustic feedback canceller 60 are not included. Therefore, two-way conversation assisting device 20c has functions for removing first echo 31, first crosstalk 32, second echo 34, and second crosstalk 35, among the functions for removing acoustic noise, which are possessed by two-way conversation assisting device 20 according to the first exemplary embodiment. However, functions for removing first acoustic feedback 30 and second acoustic feedback 33 are not included.

In this exemplary embodiment, first microphone 21 and first loudspeaker 22 are provided in an environment where second acoustic feedback 33 caused when a voice output from first loudspeaker 22 returns and enters into first microphone 21 is negligibly smaller. In addition, second microphone 23 and second loudspeaker 24 are provided in an environment where first acoustic feedback 30 caused when a voice output from second loudspeaker 24 returns and enters into second microphone 23 is negligibly smaller.

[4-3. Effects and Other Benefits]

Two-way conversation assisting device 20c according to this exemplary embodiment is installed in an environment where acoustic coupling between first microphone 21 and first loudspeaker 22 is so smaller to an extent that second acoustic feedback 33 can be neglected. Two-way conversation assisting device 20c has least functions for removing acoustic noises (first echo 31, first crosstalk 32, second echo 34, and second crosstalk 35) need to be removed when two-way conversation assisting device 20c is installed in an environment where acoustic coupling between second microphone 23 and second loudspeaker 24 is so smaller to an extent that first acoustic feedback 30 can be neglected. Accordingly, compared with the first exemplary embodiment, least acoustic noises can be removed with a smaller configuration having a less number of components, in other words, with a cost effective, compact configuration.

Similar to the first exemplary embodiment, this exemplary embodiment may be achieved as a two-way conversation assisting method and a program. Such a two-way conversation assisting method includes the above described first echo and crosstalk cancellation step and the second echo and crosstalk cancellation step.

Fifth Exemplary Embodiment

Next, a two-way conversation assisting device according to a fifth exemplary embodiment will now be described herein. Similar to the two-way conversation assisting device according to the first exemplary embodiment, the two-way conversation assisting device according to this exemplary embodiment is a device for amplifying and assisting a two-way conversation between a first conversation participant and a second conversation participant. However, included in addition to the amplification function is a function for outputting to a first conversation participant and a second conversation participant a sound from an acoustic reproducer such as a radio, a television (TV), and a music player.

[5-1. Configuration]

Figure 6:
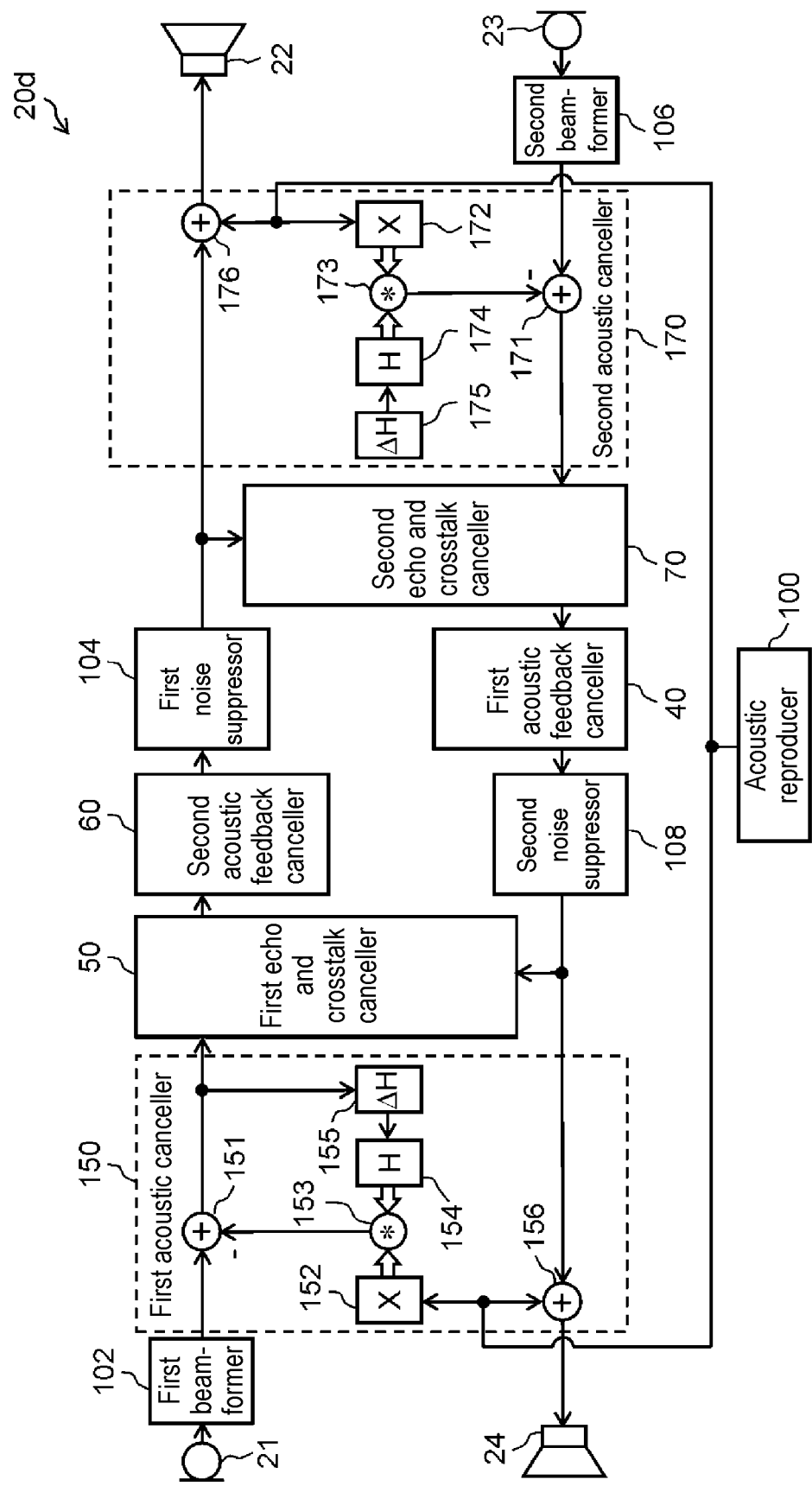
FIG. 6 is a block diagram illustrating a configuration of a two-way conversation assisting device according to a fifth exemplary embodiment.

FIG. 6 is a block diagram illustrating a configuration of two-way conversation assisting device 20d according to the fifth exemplary embodiment. In addition to the configuration of two-way conversation assisting device 20 according to the first exemplary embodiment, two-way conversation assisting device 20d includes acoustic reproducer 100, first beamformer 102, second beamformer 106, first noise suppressor 104, second noise suppressor 108, first acoustic canceller 150, and second acoustic canceller 170. Hereinafter, components identical to components of the first exemplary embodiment are applied with numerals or symbols identical to numerals or symbols used in the first exemplary embodiment, and descriptions of the components are omitted.

First beamformer 102 is a circuit for performing acoustic beamforming for aiming a directional characteristic of a voice entered into first microphone 21 including a plurality of microphones toward an intended direction (a mouth of first conversation participant 11).

Second beamformer 106 is a circuit for performing acoustic beamforming for aiming a directional characteristic of a voice entered into second microphone 23 including a plurality of microphones toward an intended direction (the mouth of second conversation participant 12).

First noise suppressor 104 is a circuit for removing an external noise entered into first microphone 21, and removes signal components, other than a voice, from an output signal of second acoustic feedback canceller 60.

Second noise suppressor 108 is a circuit for removing an external noise entered into second microphone 23, and removes signal components, other than a voice, from an output signal of first acoustic feedback canceller 40.

Acoustic reproducer 100 is a sound source for providing a sound to first conversation participant 11 and second conversation participant 12, such as, a radio, a TV, and a music player.

First acoustic canceller 150 adds an output signal (acoustic signal) of acoustic reproducer 100 to an output signal of second noise suppressor 108, and outputs an obtained signal to second loudspeaker 24. Simultaneously, based on an output signal of first beamformer 102, a first acoustic echo signal indicative of a degree of a first acoustic echo caused when a sound output from second loudspeaker 24 comes around and enters into first microphone 21 is estimated and calculated. First acoustic canceller 150 is a circuit for then removing the calculated first acoustic echo signal from the output signal of first beamformer 102, and for outputting a signal obtained after the removal to first echo and crosstalk canceller 50.

First acoustic canceller 150 includes fifth transfer function storage circuit 154, fifth storage circuit 152, fifth convolution arithmetic operation unit 153, fifth subtractor 151, fifth transfer function update circuit 155, and first adder 156. This configuration corresponds to a configuration achieved by adding first adder 156 to the configuration of first echo and crosstalk canceller 50 described in the first exemplary embodiment.

Components (fifth transfer function storage circuit 154, fifth storage circuit 152, fifth convolution arithmetic operation unit 153, fifth subtractor 151, and fifth transfer function update circuit 155) of first acoustic canceller 150 have functions similar or identical to functions of corresponding components of first echo and crosstalk canceller 50.

However, fifth storage circuit 152 stores the output signal (acoustic signal) of acoustic reproducer 100. In addition, fifth convolution arithmetic operation unit 153 generates a first acoustic echo signal described above.

In addition, first adder 156 adds the output signal (acoustic signal) of acoustic reproducer 100 to the output signal of second noise suppressor 108, and outputs an obtained signal to second loudspeaker 24.

Second acoustic canceller 170 adds the output signal (acoustic signal) of acoustic reproducer 100 to an output signal of first noise suppressor 104, and outputs an obtained signal to first loudspeaker 22. Simultaneously, based on an output signal of second beamformer 106, a second acoustic echo signal indicative of a degree of second acoustic echo caused when a sound output from first loudspeaker 22 comes around and enters into second microphone 23 is estimated and calculated. Second acoustic canceller 170 is a circuit for then removing the calculated second acoustic echo signal from the output signal of second beamformer 106, and for outputting a signal obtained after the removal to second echo and crosstalk canceller 70.

Second acoustic canceller 170 includes sixth transfer function storage circuit 174, sixth storage circuit 172, sixth convolution arithmetic operation unit 173, sixth subtractor 171, sixth transfer function update circuit 175, and second adder 176. This configuration corresponds to a configuration achieved by adding second adder 176 to the configuration of second echo and crosstalk canceller 70 described in the first exemplary embodiment.

Components (sixth transfer function storage circuit 174, sixth storage circuit 172, sixth convolution arithmetic operation unit 173, sixth subtractor 171, and sixth transfer function update circuit 175) of second acoustic canceller 170 have functions similar or identical to functions of corresponding components of second echo and crosstalk canceller 70.

However, sixth storage circuit 172 stores the output signal (acoustic signal) of acoustic reproducer 100. In addition, sixth convolution arithmetic operation unit 173 generates the second acoustic echo signal described above.

In addition, second adder 176 adds the output signal (acoustic signal) of acoustic reproducer 100 to the output signal of first noise suppressor 104, and outputs an obtained signal to first loudspeaker 22.

[5-2. Operation, Effects, and Other Benefits]

In addition to the configuration of two-way conversation assisting device 20 according to the first exemplary embodiment, two-way conversation assisting device 20d according to this exemplary embodiment which includes the configuration as described above includes first acoustic canceller 150 and second acoustic canceller 170. Therefore, in addition to the functions of two-way conversation assisting device 20 according to the first exemplary embodiment, a sound from acoustic reproducer 100, in which an acoustic echo signal is removed, is provided to first conversation participant 11 and second conversation participant 12.

In addition, two-way conversation assisting device 20d according to this exemplary embodiment, includes first beamformer 102, second beamformer 106, first noise suppressor 104, and second noise suppressor 108. Therefore, a clear conversation, in which an external noise generated by other than first conversation participant 11 and second conversation participant 12 is suppressed, can be amplified.

Other Exemplary Embodiments

As described above, the first to fifth exemplary embodiments and the modifications have been described as examples of the technology disclosed in this application. However, the technology of the present disclosure is not limited to these examples, but can be applied to exemplary embodiments where modifications, replacements, additions, and omissions are appropriately made. In addition, components described in the above-described first to fifth exemplary embodiments and the modifications can be combined to configure a new exemplary embodiment. Then other exemplary embodiments will now be described herein.

For example, in two-way conversation assisting device 20d according to the fifth exemplary embodiment, an additional configuration (acoustic reproducer 100, first beamformer 102, second beamformer 106, first noise suppressor 104, second noise suppressor 108, first acoustic canceller 150, and second acoustic canceller 170) has been added to two-way conversation assisting device 20 according to the first exemplary embodiment. The additional configuration may be added to any of the two-way conversation assisting devices according to the second to fourth exemplary embodiments.

In addition, only a partial configuration (e.g., first beamformer 102 and second beamformer 106 only) of the additional configuration (acoustic reproducer 100, first beamformer 102, second beamformer 106, first noise suppressor 104, second noise suppressor 108, first acoustic canceller 150, and second acoustic canceller 170) may be added to any of the first to fourth exemplary embodiments. For example, when first acoustic canceller 150 and second acoustic canceller 170 only are added to two-way conversation assisting device 20 according to the first exemplary embodiment, an output signal of first microphone 21 will be input into fifth subtractor 151 of first acoustic canceller 150, and an output signal of second microphone 23 will directly be input into sixth subtractor 171 of second acoustic canceller 170. In addition, an output signal of first acoustic feedback canceller 40 will be input, as a signal from second microphone 23, into first adder 156 of first acoustic canceller 150, and an output signal of second acoustic feedback canceller 60 will be input, as a signal from first microphone 21, into second adder 176 of second acoustic canceller 170.

In addition, the first to fifth exemplary embodiments have illustrated examples where the devices for assisting two-way conversation are applied as devices for assisting in-cabin conversation. The first to fifth exemplary embodiments are not limited to the exemplary applications as described above, but may be applied as a device for assisting a conversation in a room such as a meeting room, as well as a device for assisting a conversation between a driver and an employee at a drive-through. Since a two-way conversation assisting device according to the present disclosure removes crosstalk in a two-way conversation, the two-way conversation assisting device according to the present disclosure is advantageous when used as a device for assisting a conversation in an environment where crosstalk can easily occur (e.g., a conversation in a single space).

In addition, in the first to fifth exemplary embodiments, the convolution arithmetic operation units respectively included in first acoustic feedback canceller 40, first echo and crosstalk canceller 50, second acoustic feedback canceller 60, and second echo and crosstalk canceller 70 each perform a convolution arithmetic operation, taking an N-tap FIR filter as an example. However, the convolution arithmetic operation units may respectively be digital filters each having a different number of taps. In other words, any type of digital filter may be appropriately and independently designed depending on factors including a transfer function with respect to an acoustic noise to be canceled.

In addition, in the first to fifth exemplary embodiments, update algorithms for transfer functions, which are executed by transfer function update circuits respectively included in first acoustic feedback canceller 40, first echo and crosstalk canceller 50, second acoustic feedback canceller 60, and second echo and crosstalk canceller 70 may each be a single algorithm, as represented by expressions 3, 6, 9, and 12 described above. Alternatively, step size parameters may differ in a single algorithm, or different algorithms may be used. In other words, an update algorithm for a transfer function may be appropriately and independently designed depending on factors including magnitude of an acoustic noise to be canceled.

In addition, the devices for assisting two-way conversation, according to the first and fifth exemplary embodiments, have been configured to remove an echo and crosstalk, and then to remove acoustic feedback, from a voice signal input from a microphone. However, the devices may be configured to first remove acoustic feedback, and then to remove an echo and crosstalk. That is, an order of first echo and crosstalk canceller 50 and second acoustic feedback canceller 60, and an order of second echo and crosstalk canceller 70 and first acoustic feedback canceller 40 can respectively be switched. Even in this case, an effect identical to an effect of each of the devices for assisting two-way conversation, according to the first and fifth exemplary embodiments, can be obtained.

In addition, the fifth exemplary embodiment has illustrated an example where a first acoustic echo signal has been removed from an output signal of first beamformer 102. However, a first acoustic echo signal may be removed from an output signal of first echo and crosstalk canceller 50 or second acoustic feedback canceller 60. Similarly, a second acoustic echo signal may also be removed from an output signal of second echo and crosstalk canceller 70 or first acoustic feedback canceller 40.

In addition, the above described exemplary embodiments have described examples of microphones and loudspeakers included in a two-way conversation assisting device, such as a type where microphones and loudspeakers are incorporated in a vehicle, a type where microphones and loudspeakers are attached to a vehicle, and a head set. However, microphones and/or loudspeakers are not limited to the examples, but may be included in a hand-held information terminal such as a smart phone. For example, a voice of a rear passenger in a vehicle is collected by a smart phone served as second microphone 23, is sent in a wireless manner to a head unit (two-way conversation assisting device), and is amplified from a front loudspeaker served as second loudspeaker 24, in a state where acoustic feedback, an echo, and crosstalk are suppressed. In addition, a voice of a driver collected by a front microphone served as first microphone 21 is sent in a wireless manner to the smart phone possessed by the rear passenger, and is amplified by a loudspeaker of the smart phone served as first loudspeaker 22, in a state where acoustic feedback, an echo, and crosstalk are suppressed. Therefore, the rear passenger is able to make a conversation with the driver using the smart phone, and thus a rear microphone is not required in the vehicle.

In addition, a two-way conversation assisting device, using a microphone and/or a loudspeaker included in a hand-held information terminal such as a smart phone, as described above, is also applicable as a public address (PA) system used in a lecture, for example. In the lecture, a voice of a questioner can be collected with his or her smart phone, can be sent in a wireless manner to the PA system, and can be amplified in a state where acoustic feedback and an echo are suppressed. Therefore, in the lecture, a time required to pass a microphone to the questioner can be shortened, questions and answers can smoothly be exchanged, and the lecture can be continued in a seamless manner.

As described above, the exemplary embodiments have been described for exemplifying the technology of the present disclosure. The appended drawings and the detailed description have been provided for that purpose.

Therefore, in order to exemplify the above-described technology, the appended drawings and the detailed description include not only components that are essential for solving problems, but also components that are not essential for solving the problems. Accordingly, it should not be construed that the component that are not essential are essential because the components are described in the appended drawings and the detailed description.

In addition, since the above-described exemplary embodiments are used for exemplifying the technology of the present disclosure, various modifications, replacements, additions, and omissions can be made within the scope of the claims and their equivalents.

INDUSTRIAL APPLICABILITY

The present disclosure is applicable to a two-way conversation assisting device for amplifying and assisting a two-way conversation by removing acoustic noises including not only an echo, but also crosstalk. Specifically, the present disclosure is applicable to a device for assisting in-cabin conversation, a PA system, and other similar devices.

REFERENCE MARKS IN THE DRAWINGS

10: vehicle
11: first conversation participant
12: second conversation participant
20, 20a, 20b, 20c, 20d: two-way conversation assisting device
21: first microphone
22: first loudspeaker
23: second microphone
24: second loudspeaker
30: first acoustic feedback
31: first echo
32: first crosstalk
33: second acoustic feedback
34: second echo
35: second crosstalk
40: first acoustic feedback canceller
41: first subtractor
42: first storage circuit
43: first convolution arithmetic operation unit
44: first transfer function storage circuit
45: first transfer function update circuit
46: first delay device
50: first echo and crosstalk canceller
51: second subtractor
52: second storage circuit
53: second convolution arithmetic operation unit
54: second transfer function storage circuit
55: second transfer function update circuit
60: second acoustic feedback canceller
61: third subtractor
62: third storage circuit
63: third convolution arithmetic operation unit
64: third transfer function storage circuit
65: third transfer function update circuit
66: second delay device
70: second echo and crosstalk canceller
71: fourth subtractor
72: fourth storage circuit
73: fourth convolution arithmetic operation unit
74: fourth transfer function storage circuit
75: fourth transfer function update circuit
100: acoustic reproducer
102: first beamformer
104: first noise suppressor
106: second beamformer
108: second noise suppressor 150: first acoustic canceller
151: fifth subtractor
152: fifth storage circuit
153: fifth convolution arithmetic operation unit
154: fifth transfer function storage circuit
155: fifth transfer function update circuit
156: first adder
170: second acoustic canceller
171: sixth subtractor
172: sixth storage circuit
173: sixth convolution arithmetic operation unit
174: sixth transfer function storage circuit
175: sixth transfer function update circuit
176: second adder

The invention claimed is:

1. A two-way conversation assisting device for amplifying and assisting a two-way conversation,
the two-way conversation assisting device comprising:
a first microphone that enters a first voice;
a first loudspeaker that outputs the first voice;
a second microphone that enters a second voice;
a second loudspeaker that outputs the second voice; and
a first echo and crosstalk canceller that estimates and calculates, using an input signal into the second loudspeaker, a first interference signal indicative of degrees of a first acoustic echo caused when the second voice output from the second loudspeaker enters into the first microphone and first acoustic crosstalk caused when the second voice enters into the first microphone, and that removes the calculated first interference signal from an output signal of the first microphone.

2. The two-way conversation assisting device according to claim 1, further comprising
a first acoustic feedback canceller that estimates and calculates a first acoustic feedback signal indicative of a degree of first acoustic feedback caused when the second voice output from the second loudspeaker enters into the second microphone, and that removes the calculated first acoustic feedback signal from an output signal of the second microphone.

3. The two-way conversation assisting device according to claim 2, further comprising:
a second acoustic feedback canceller that estimates and calculates a second acoustic feedback signal indicative of a degree of second acoustic feedback caused when the first voice output from the first loudspeaker enters into the first microphone, and that removes the calculated second acoustic feedback signal from the output signal of the first microphone; and
a second echo and crosstalk canceller that estimates and calculates, using an input signal into the first loudspeaker, a second interference signal indicative of degrees of a second acoustic echo caused when the first voice output from the first loudspeaker enters into the second microphone and second acoustic crosstalk caused when the first voice enters into the second microphone, and that removes the calculated second interference signal from the output signal of the second microphone.

4. The two-way conversation assisting device according to claim 3, further comprising:
a first acoustic canceller that estimates and calculates, using an acoustic signal, a first acoustic echo signal indicative of a degree of a first acoustic echo caused when a sound output from the second loudspeaker enters into the first microphone, and that removes the calculated first acoustic echo signal from the output signal of the first microphone; and
a second acoustic canceller that estimates and calculates, using the acoustic signal, a second acoustic echo signal indicative of a degree of a second acoustic echo caused when a sound output from the first loudspeaker enters into the second microphone, and that removes the calculated second acoustic echo signal from the output signal of the second microphone.

5. The two-way conversation assisting device according to claim 4, wherein
the first acoustic canceller includes
a fifth transfer function storage circuit that stores a transfer function estimated as a transfer function with respect to the first acoustic echo,
a fifth storage circuit that stores the acoustic signal,
a fifth convolution arithmetic operation unit that performs a convolution with the acoustic signal stored in the fifth storage circuit and the transfer function stored in the fifth transfer function storage circuit to generate the calculated first acoustic echo signal,
a fifth subtractor that removes from the output signal of the first microphone the calculated first acoustic echo signal output from the fifth convolution arithmetic operation unit, and that outputs an output signal of the first acoustic canceller, and
a fifth transfer function update circuit that updates the transfer function stored in the fifth transfer function storage circuit based on the output signal of the fifth subtractor and the acoustic signal stored in the fifth storage circuit, and
the second acoustic canceller includes
a sixth transfer function storage circuit that stores a transfer function estimated as a transfer function with respect to the second acoustic echo,
a sixth storage circuit that stores the acoustic signal,
a sixth convolution arithmetic operation unit that performs a convolution with the acoustic signal stored in the sixth storage circuit and the transfer function stored in the sixth transfer function storage circuit to generate the calculated second acoustic echo signal,
a sixth subtractor that removes from the output signal of the second microphone the calculated second acoustic echo signal output from the sixth convolution arithmetic operation unit, and that outputs an output signal of the second acoustic canceller, and
a sixth transfer function update circuit that updates the transfer function stored in the sixth transfer function storage circuit based on the output signal of the sixth subtractor and the acoustic signal stored in the sixth storage circuit.

6. The two-way conversation assisting device according to claim 5, wherein
the first acoustic canceller further includes a first adder that adds the acoustic signal to the input signal into the second loudspeaker, and
the second acoustic canceller further includes a second adder that adds the acoustic signal to the input signal into the first loudspeaker.

7. The two-way conversation assisting device according to claim 3, wherein
for the first voice uttered at a certain time, a time when the output signal of the first microphone is input into the second echo and crosstalk canceller is identical to or earlier than a time when the first voice enters into the second microphone, and for the second voice uttered at a certain time, a time when the output signal of the second microphone is input into the first echo and crosstalk canceller is identical to or earlier than a time when the second voice enters into the first microphone.

8. The two-way conversation assisting device according to claim 3, wherein
the first acoustic feedback canceller includes
a first transfer function storage circuit that stores a transfer function estimated as a transfer function with respect to the first acoustic feedback,
a first delay device that delays an output signal of the first acoustic feedback canceller,
a first storage circuit that stores a signal output from the first delay device,
a first convolution arithmetic operation unit that performs a convolution with the signal stored in the first storage circuit and the transfer function stored in the first transfer function storage circuit to generate the calculated first acoustic feedback signal,
a first subtractor that removes from the output signal of the second microphone the first acoustic feedback signal output from the first convolution arithmetic operation unit, and that outputs the output signal of the first acoustic feedback canceller, and
a first transfer function update circuit that updates the transfer function stored in the first transfer function storage circuit based on the output signal of the first subtractor and the signal stored in the first storage circuit.

9. The two-way conversation assisting device according to claim 8, wherein
the first echo and crosstalk canceller includes
a second transfer function storage circuit that stores a transfer function estimated as a transfer function with respect to the first acoustic echo and the first acoustic crosstalk combined to each other,
a second storage circuit that stores the output signal of the second microphone,
a second convolution arithmetic operation unit that performs a convolution with the output signal stored in the second storage circuit and the transfer function stored in the second transfer function storage circuit to generate the calculated first interference signal,
a second subtractor that removes from the output signal of the calculated first microphone the first interference signal output from the second convolution arithmetic operation unit, and that outputs an output signal of the first echo and crosstalk canceller, and
a second transfer function update circuit that updates the transfer function stored in the second transfer function storage circuit based on the output signal of the second subtractor and the output signal stored in the second storage circuit.

10. The two-way conversation assisting device according to claim 9, wherein
the second acoustic feedback canceller includes
a third transfer function storage circuit that stores a transfer function estimated as a transfer function with respect to the second acoustic feedback,
a second delay device that delays an output signal of the second acoustic feedback canceller,
a third storage circuit that stores a signal output from the second delay device,
a third convolution arithmetic operation unit that performs a convolution with the signal stored in the third storage circuit and the transfer function stored in the third transfer function storage circuit to generate the second acoustic feedback signal,
a third subtractor that removes from the output signal of the first microphone the calculated second acoustic feedback signal output from the third convolution arithmetic operation unit, and that outputs the output signal of the second acoustic feedback canceller, and
a third transfer function update circuit that updates the transfer function stored in the third transfer function storage circuit based on the output signal of the third subtractor and the signal stored in the third storage circuit.

11. The two-way conversation assisting device according to claim 10, wherein
the second echo and crosstalk canceller includes
a fourth transfer function storage circuit that stores a transfer function estimated as a transfer function with respect to the second acoustic echo and the second acoustic crosstalk combined to each other,
a fourth storage circuit that stores the output signal of the first microphone,
a fourth convolution arithmetic operation unit that performs a convolution with the output signal stored in the fourth storage circuit and the transfer function stored in the fourth transfer function storage circuit to generate the calculated second interference signal,
a fourth subtractor that removes from an output signal of the second microphone the calculated interference signal output from the fourth convolution arithmetic operation unit, and that outputs an output signal of the second echo and crosstalk canceller, and
a fourth transfer function update circuit that updates the transfer function stored in the fourth transfer function storage circuit based on the output signal of the fourth subtractor and the output signal stored in the fourth storage circuit.

12. The two-way conversation assisting device according to claim 11, wherein
the first transfer function update circuit uses an independent component analysis to update the transfer function stored in the first transfer function storage circuit based on the signal of the first subtractor and the signal stored in the first storage circuit such that the signal of the first subtractor and the signal stored in the first storage circuit are independent from each other,
the second transfer function update circuit uses an independent component analysis to update the transfer function stored in the second transfer function storage circuit based on the output signal of the second subtractor and the output signal stored in the second storage circuit such that the output signal of the second subtractor and the output signal stored in the second storage circuit are independent from each other,
the third transfer function update circuit uses an independent component analysis to update the transfer function stored in the third transfer function storage circuit based on the output signal of the third subtractor and the signal stored in the third storage circuit such that the output signal of the third subtractor and the signal stored in the third storage circuit are independent from each other, and
the fourth transfer function update circuit uses an independent component analysis to update the transfer function stored in the fourth transfer function storage circuit based on the signal of the fourth subtractor and the output signal stored in the fourth storage circuit such that the signal of the fourth subtractor and the output signal stored in the fourth storage circuit are independent from each other.

13. The two-way conversation assisting device according to claim 12, wherein the first transfer function update circuit performs nonlinear processing using a nonlinear function on the output signal of the first subtractor, performs a multiplication on an obtained result with the signal stored in the first storage circuit and a first step size parameter for controlling a learning speed in estimating the transfer function with respect to the first acoustic feedback to calculate a first update coefficient, and adds the calculated first update coefficient to the transfer function stored in the first transfer function storage circuit for updating, the second transfer function update circuit performs nonlinear processing using a nonlinear function on the output signal of the second subtractor, performs a multiplication on an obtained result with the signal stored in the second storage circuit and a second step size parameter for controlling a learning speed in estimating the transfer function with respect to the first acoustic echo and the first acoustic crosstalk combined to each other to calculate a second update coefficient, and adds the calculated second update coefficient to the transfer function stored in the second transfer function storage circuit for updating, the third transfer function update circuit performs nonlinear processing using a nonlinear function on the output signal of the third subtractor, performs a multiplication on an obtained result with the signal stored in the third storage circuit and a third step size parameter for controlling a learning speed in estimating the transfer function with respect to the second acoustic feedback to calculate a third update coefficient, and adds the calculated third update coefficient to the transfer function stored in the third transfer function storage circuit for updating, and the fourth transfer function update circuit performs nonlinear processing using a nonlinear function on the output signal of the fourth subtractor, performs a multiplication on an obtained result with the signal stored in the fourth storage circuit and a fourth step size parameter for controlling a learning speed in estimating the transfer function with respect to the second acoustic echo and the second acoustic crosstalk combined to each other to calculate a fourth update coefficient, and adds the calculated fourth update coefficient to the transfer function stored in the fourth transfer function storage circuit for updating.

14. The two-way conversation assisting device according to claim 13, wherein the nonlinear function used in each of the first transfer function update circuit, the second transfer function update circuit, the third transfer function update circuit, and the fourth transfer function update circuit is a sigmoid function, a hyperbolic tangent function, a rectified linear function, or a sign function.

15. The two-way conversation assisting device according to claim 1, further comprising a second echo and crosstalk canceller that estimates and calculates, using an input signal into the first loudspeaker, a second interference signal indicative of degrees of a second acoustic echo caused when the first voice output from the first loudspeaker enters into the second microphone and second acoustic crosstalk caused when the first voice enters into the second microphone, and that removes the calculated second interference signal from an output signal of the second microphone.

16. The two-way conversation assisting device according to claim 1, wherein the output signal of the first microphone removes both the first acoustic echo and the first acoustic crosstalk together.

17. A two-way conversation assisting method for amplifying and assisting a two-way conversation, the two-way conversation assisting method being used in
a conversation system including
a first microphone that enters a first voice,
a first loudspeaker that outputs the first voice,
a second microphone that enters a second voice, and
a second loudspeaker that outputs the second voice, the two-way conversation assisting method comprising a first echo and crosstalk estimating and calculating, using an input signal into the second loudspeaker, a first interference signal indicative of degrees of a first acoustic echo caused when the second voice output from the second loudspeaker enters into the first microphone and first acoustic crosstalk caused when the second voice enters into the first microphone, and removing the calculated first interference signal from an output signal of the first microphone.

18. The two-way conversation assisting method according to claim 17, further comprising a first acoustic feedback estimating and calculating a first acoustic feedback signal indicative of a degree of first acoustic feedback caused when the second voice output from the second loudspeaker enters into the second microphone, and removing the calculated first acoustic feedback signal from an output signal of the second microphone.

19. The two-way conversation assisting method according to claim 18, further comprising:

a second acoustic feedback estimating and calculating a second acoustic feedback signal indicative of a degree of second acoustic feedback caused when the first voice output from the first loudspeaker enters into the first microphone, and removing the calculated second acoustic feedback signal from the output signal of the first microphone; and a second echo and crosstalk estimating and calculating, using an input signal into the first loudspeaker, a second interference signal indicative of degrees of a second acoustic echo caused when the first voice output from the first loudspeaker enters into the second microphone and second acoustic crosstalk caused when the first voice enters into the second microphone, and removing the calculated second interference signal from the output signal of the second microphone.

20. The two-way conversation assisting method according to claim 17, further comprising a second echo and crosstalk estimating and calculating, using an input signal into the first loudspeaker, a second interference signal indicative of degrees of a second acoustic echo caused when the first voice output from the first loudspeaker enters into the second microphone and second acoustic crosstalk caused when the first voice enters into the second microphone, and removing the calculated second interference signal from an output signal of the second microphone.

21. The two-way conversation assisting method according to claim 19, further comprising:

a first acoustic estimating and calculating, using an acoustic signal, a first acoustic echo signal indicative of a degree of a first acoustic echo caused when a sound output from the second loudspeaker enters into the first microphone, and removing the calculated first acoustic echo signal from the output signal of the first microphone; and a second acoustic estimating and calculating, using the acoustic signal, a second acoustic echo signal indicative of a degree of a second acoustic echo caused when a sound output from the first loudspeaker enters into the second microphone, and removing the calculated second acoustic echo signal from the output signal of the second microphone.

22. The two-way conversation assisting method according to claim 17, wherein the output signal of the first microphone removes both the first acoustic echo and the first acoustic crosstalk together.

* * * * *